(12) United States Patent
Tatsuta et al.

(10) Patent No.: US 8,437,236 B2
(45) Date of Patent: May 7, 2013

(54) OPTICAL INFORMATION RECORDING/REPRODUCING APPARATUS AND METHOD

(75) Inventors: Shinichi Tatsuta, Tokyo (JP); Masataka Shiratsuchi, Kanagawa (JP); Hideaki Okano, Kanagawa (JP); Yuji Kubota, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 215 days.

(21) Appl. No.: 12/409,865

(22) Filed: Mar. 24, 2009

(65) Prior Publication Data

US 2010/0054103 A1 Mar. 4, 2010

(30) Foreign Application Priority Data

Sep. 4, 2008 (JP) ................. 2008-227553

(51) Int. Cl.
*G11B 7/00* (2006.01)
(52) U.S. Cl.
USPC .......................................................... 369/103
(58) Field of Classification Search .................. None
See application file for complete search history.

(56) References Cited

U.S. PATENT DOCUMENTS

| | | | |
|---|---|---|---|
| 5,483,365 A | 1/1996 | Pu et al. | |
| 6,700,686 B2 | 3/2004 | King et al. | |
| 7,835,249 B2 * | 11/2010 | Usami et al. | 369/103 |
| 7,848,204 B2 * | 12/2010 | Lan et al. | 369/103 |
| 2007/0297032 A1 * | 12/2007 | Harvey et al. | 359/22 |

FOREIGN PATENT DOCUMENTS

| | | |
|---|---|---|
| JP | 05-282698 | 10/1993 |
| JP | 2000-081833 | 3/2000 |
| JP | 2004-354565 | 12/2004 |
| JP | 2005-004829 | 1/2005 |
| JP | 2006-235261 | 9/2006 |
| JP | 2007108385 | 4/2007 |
| JP | 2007-333928 | 12/2007 |
| WO | 2007/114011 A1 | 10/2007 |

OTHER PUBLICATIONS

Japanese Office Action for Japanese Application No. 2008-227553 mailed on May 15, 2012.
Holographic Data Storage, H.J. Coufal, D. Psaltis, G.T. Sincerbox, 2000.
Japanese Office Action for Japanese Application No. 2008-227553 mailed on Aug. 7, 2012.

* cited by examiner

*Primary Examiner* — Joseph Feild
*Assistant Examiner* — Parul Gupta
(74) *Attorney, Agent, or Firm* — Turocy & Watson, LLP

(57) ABSTRACT

An optical information recording/reproducing apparatus includes a spatial light modulator that converts an irradiation beam emitted from a light source to a single information beam that carries information; an optical system that causes the single information beam to be collected on an optical-information recording medium including an information recording layer capable of recording the information as hologram by using interference fringes produced due to interference between the single information beam and a plurality of reference beams, and causes each of the reference beams to be irradiated to the optical-information recording medium from mutually different directions so as to intersect with the single information beam in the information recording layer; and a controller that controls to cause the light source to emit the irradiation beam and performs angular multiplexing recording of the information in the information recording layer while controlling to drive either one of the optical-information recording medium and the optical system.

2 Claims, 14 Drawing Sheets

OPTICAL INFORMATION RECORDING/REPRODUCING APPARATUS AND METHOD

CROSS-REFERENCE TO RELATED APPLICATIONS

This application is based upon and claims the benefit of priority from the prior Japanese Patent Application No. 2008-227553, filed on Sep. 4, 2008; the entire contents of which are incorporated herein by reference.

BACKGROUND OF THE INVENTION

1. Field of the Invention

The present invention relates to an optical information recording/reproducing apparatus and method for recording/reproducing information as hologram.

2. Description of the Related Art

Optical information recording media typically include a compact disk (CD), a digital versatile disk (DVD), a high-definition digital versatile disc (HD DVD), Blu-ray Disk, and the like. The optical information recording medium responds to an increase in recording density so far mainly by making a wavelength of a laser beam shorter and by increasing the numerical aperture (NA) of an objective lens. However, both the methods seem to be approaching the limit by some technical reasons, and it is therefore required to increase the recording density by other means and systems.

Recently, among various approaches, a volume-recording type high-density optical recording using holography (hereinafter, "holographic memory") and a recording/reproducing device of the holographic memory (hereinafter, "holographic-memory recording/reproducing apparatus") are being developed for practical use.

A recoding system of the holographic-memory recording medium is implemented in such a manner that an information beam and a reference beam are irradiated to one location of a recording medium to record therein interference fringes produced by the information beam and the reference beam upon irradiation. Specifically, the information beam carries information thereon by spatially modulating a laser beam using a spatial light modulator (SLM) such as a liquid crystal element and a digital micromirror device, and the reference beam with the same wavelength as that of the information beam is usually generated from the same light source as that of the information beam.

When information is reproduced from the holographic-memory recording medium, by radiating only the reference beat, the information beam upon recording is reproduced, to obtain information modulated at the time of recording. There is a so-called surface recording system such as a digital versatile disk (DVD) in which record marks are recorded on a recording surface. On the other hand, there is a holographic optical disc that is a volume recording system capable of recording information in the thickness direction of an information recording layer, and therefore the holographic optical disc can obtain higher recording density as compared with that of DVD.

In the case of DVD, the record marks generally indicate ON/OFF bit data, while in the case of the holographic-memory recording medium, the information beam is collectively modulated because of its comparatively large volume of information, to be recorded therein as interference fringes. This pair of information is a modulation pattern of the information beam held in the recording medium, and this modulation pattern is a unit of recording or reproduction of a two-dimensional barcode that consists of black and white dots, which is called page data.

One of methods of increasing the recording density of the holographic-memory recording medium is a multiple recording system. The multiple recording system is a system of recording a plurality of page data in one location of the holographic-memory recording medium, the system including various systems such as an angular multiplexing recording system of recording information while an irradiation angle of a laser bean is shifted and a shift multiplexing recording system of recording information while slightly shifting an irradiation position of a laser beam. A general multiplexing system is disclosed in, for example, a technical literature 'H. J. Coufal, D. Psaltis, G. T. Sincerbox, "Holographic Data Storage", Springer, 2000'.

In the angular multiplexing recording system and the shift multiplexing recording system, multiple recording is implemented by changing a relative angle or a relative position between a laser beam and a holographic-memory recording medium. The angular multiplexing recording system in particular is a system totally different from conventional disks such as a compact disk (CD) and a DVD, and is needed for a so-called two-light flux interference system in which interference fringes produced in a position of interference between the information beam and the reference beam are recorded in a medium recording layer.

When the angular multiplexing recording system and the shift multiplexing recording system are to be combined, it is considered that there are two typical technologies; a technology for causing a recording medium to rotate to perform angular multiplexing recording, and a technology for causing a laser beam to rotate around a recording medium to perform angular multiplexing recording. A rotation axis of the recording medium is generally set as an axis perpendicular to an incident plane of the information beam and the reference beam (or, an axis in a plane direction of the recording medium). It is considered that this setting can achieve a larger number of multiples than that upon rotation around some other axis. Hereafter, the rotation around the axis perpendicular to the incident plane of the information beam and the reference beam is called $\theta_y$ rotation, and multiple recording due to the rotation is called $\theta_y$ multiple recording.

The technology for causing not a laser beam but a recording medium to rotate to perform angular multiplexing recording has such features that the device configuration can be simplified because a movable unit for multiple recording does not need to be provided in an optical system such as lenses. However, this technology is difficult to be applied to a disk-shaped recording medium such as CD or DVD that rotates at a comparatively high speed. On the other hand, the technology for causing a laser beam to rotate around a recording medium to perform angular multiplexing recording has such characteristics that it is easily applied to the disk-shaped recording medium but the device structure becomes large.

Further, for example, U.S. Pat. Nos. 5,483,365 and 6,700,686, and JP-A 2004-354565 (KOKAI) disclose a technology for performing angular multiplexing in which two axes are used in such a manner that rotation around other axis is performed in addition to the $\theta_y$ rotation. This technology allows further improvement of recording density by performing angular multiplexing recording, in addition to the $\theta_y$ rotation, while rotating the recording medium or the laser beam around an axis perpendicular to a medium plane of the recording medium and passing through a recording spot. Hereafter, the rotation around the axis perpendicular to the medium plane and passing through the recording spot is called $\theta_z$ rotation, and multiple recording due to the rotation around the axis is called $\theta_z$ multiple recording.

However, there is an upper limit in a multiple number of the $\theta_z$ multiple recording, and it is known that there occurs crosstalk such that if the number exceeds a certain number, some data recorded at an adjacent angle comes in a reproduced image upon reproduction. This is because, unlike the $\theta_y$ multiple recording, the $\theta_z$ multiple recording has such characteristics that a range (maximum span) where recording can be performed is restricted to 180 degrees (half-turn) no matter how many rotations are made, and the intensity of a reproduction beam coming in from an adjacent page does not sufficiently decrease unless it is rotated quite largely.

The upper limit of the multiple number decreases as an increase in the numerical aperture (NA) of an objective lens through which the information beam passes. In the case of NA 0.65, the upper limit becomes about 2 to 3 depending on a form of page data, so that only 2 to 3 spots can be recorded every 90 degrees or 60 degrees in a rotation angle of 180 degrees. Therefore, the $\theta_z$ multiple recording requires any mechanism and adjustment or the like to accurately rotate the recording medium or the laser beam without displacement, which becomes a disadvantage in that the device structure becomes complicated. Consequently, the disadvantage may overweigh an advantage in that high recording density is achieved by using the $\theta_z$ multiple recording.

SUMMARY OF THE INVENTION

According to one aspect of the present intention, an optical information recording/reproducing apparatus includes a spatial light modulator that converts an irradiation beam emitted from a light source to a single information beam that carries information; an optical system that causes the single information beam to be collected on an optical-information recording medium including an information recording layer capable of recording the information as hologram by using interference fringes produced due to interference between the single information beam and a plurality of reference beams, and causes each of the reference beams to be irradiated to the optical-information recording medium from mutually different directions so as to intersect with the single information beam in the information recording layer; a drive unit that drives either one of the optical-information recording medium and the optical system; and a controller that controls to cause the light source to emit the irradiation beam and performs angular multiplexing recording of the information in the information recording layer while controlling to drive either one of the optical-information recording medium and the optical mechanism.

According to another aspect of the present invention, an optical information recording/reproducing method includes converting an irradiation beam emitted from a light source to a single information beam that carries information; causing the single information beam to be collected on an optical-information recording medium including an information recording layer capable of recording the information as hologram by using interference fringes produced due to interference between the single information beam and a plurality of reference beams, and causing each of the reference beams to be irradiated to the optical-information recording medium from mutually different directions so as to intersect with the single information beam in the information recording layer; controlling to cause the light source to emit the irradiation beam and performs angular multiplexing recording of the information in the information recording layer while controlling to drive either one of the optical-information recording medium and the optical system by a drive unit; and switching between irradiations of the reference beams to the optical-information recording medium.

DETAILED DESCRIPTION OF THE INVENTION

Exemplary embodiments of an optical information recording/reproducing apparatus and method according to the present invention are explained in detail below with reference to the accompanying drawings.

Figure 1:
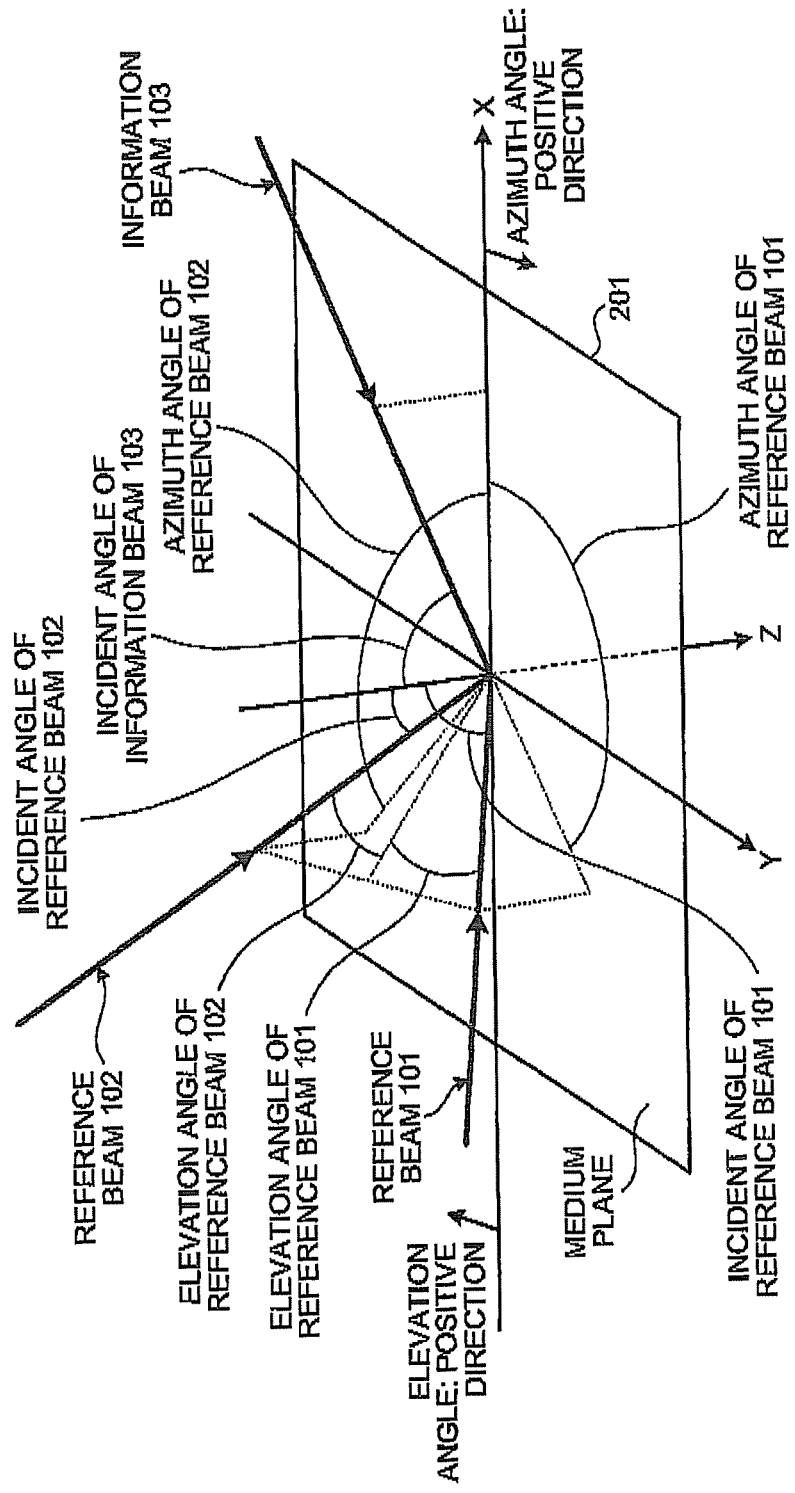
FIG. 1 is a schematic diagram of an overview of position and angle relations between an information beam and a reference beam in holographic-memory recording/reproducing apparatuses according to first to third embodiments of the present invention.

FIG. 1 is a schematic diagram of an overview of position and angle relations between an information beam and a reference beam in a holographic-memory recording/reproducing apparatus according to a first embodiment of the present invention. The first embodiment employs an optical system of a two-light flux system in which the information beam and the reference beam are made incident on a holographic-memory recording medium through discrete objective lenses so as to overlap each other on a hologram recording layer of the holographic-memory recording medium.

In FIG. 1, to avoid complication, optical components and optical paths or the like arranged along a path from a light source of the information beam and the reference beam to an imaging unit that detects a reproduced image are omitted. Optical paths of the information beam and the reference beam made incident on the holographic-memory recording medium are conceptually shown only when the reference beam has two systems. The number of reference beams, how to make a coordinate system, and respective angles are not limited to the relation shown in FIG. 1. Details of an optical structure of the first embodiment will be explained later.

Referring to FIG. 1, an xyz rectangular coordinate system fixed to the hologram recording layer of a holographic-memory recording medium 201 is discussed. A recording spot formed by an information beam 103 and reference beams 101 and 102 on a medium plane of the hologram recording layer is set as an origin, z-axis is set to the thickness direction of the holographic-memory recording medium 201 or to a direction vertical to the medium plane, and x-axis and y-axis are set to directions orthogonal to the z-axis, namely, are mutually orthogonal to the plane direction of the medium plane of the hologram recording layer.

The information beam 103 enters the medium plane from the x-axis positive direction. The x-axis is set so that an azimuth angle becomes zero. That is, the incident plane of the information beam 103 becomes an x-z plane. However, this case is applied only to the optical axis of the information beam 103, and therefore, when the NA of the objective lens of the information beam 103 in particular is large, the information beam 103 as convergent light having an angular width is made conically incident on the medium. Thus, the incident angle and the azimuth angle thereof are distributed within a predetermined width. For example, if NA is 0.65, then the information beam 103 enters the holographic-memory recording medium 201 (hologram recording layer) in a width range of about ±40.5 degrees around the optical axis.

In the first embodiment, the information beam 103 is singly irradiated to the holographic-memory recording medium 201. This is because a light spot of the information beam 103 irradiated to the holographic-memory recording medium 201 needs to be made as small as possible to improve the recording density of the holographic-memory recording medium 201. To obtain a smaller light spot of the information beam 103, an objective lens 218 (explained later) having a large NA has to be used, and the objective lens 218 having the large NA is thereby arranged. This arrangement does not allow a plurality of optical paths of information beams. In other words, in the first embodiment, by irradiating the single information beam 103 and the reference beams 101 and 102 to the holographic-memory recording medium 201, higher recording density of the holographic-memory recording medium 201 is achieved with a simple optical system. Specifically, an incident angle of the information beam 103 to the holographic-memory recording medium 201 is a maximum of 70 degrees. Therefore, the numerical aperture (NA) of the objective lens becomes 0.57 or more, and a plurality of information beams cannot thereby be irradiated. Because of this, in the first embodiment, the single information beam 103 is irradiated.

The z-axis is set so that the opposite side to the incidence of the information beam 103 through the medium plane is a positive direction, and the coordinate system is set based on the right hand system.

In the first embodiment, the two reference beams 101 and 102 are irradiated to the holographic-memory recording medium 201, and the $\theta_y$ multiple recording of information in the hologram recording layer and reproduction of information therefrom are performed while the $\theta_y$ rotation is executed at each predetermined angle step. With this feature, the $\theta_y$ multiple recording is performed while the two reference beams 101 and 102 are irradiated to the holographic-memory recording medium 201 so as to intersect the information beam 103. This allows implementation of multiple recording corresponding to the $\theta_z$ multiple recording with a comparatively simple structure in addition to the $\theta_y$ multiple recording, and the multiple recording is actually implemented using the two axes.

The two reference beams 101 and 102 are made incident on the plane from a z-axis negative direction symmetrically with respect to the x-z plane. Specifically, the incident angles of the reference beams 101 and 102 are equal to each other, and the azimuth angles thereof are the same as each other but the positive and negative thereof are reversed Assuming that the incident plane of the two reference beams 101 and 102 is different from the incident plane of the optical axis of the information beam 103, even if an incident angle when a single reference beam is irradiated and incident angles when a plurality of incident angles are irradiated (incident angles of the reference beams 101 and 102) are the same angle as each other, a wider span of the $\theta_y$ multiple recording can be obtained in the case of the reference beams than that in the case of the single reference beam.

By irradiating the reference beams 101 and 102 to the holographic-memory recording medium 201 so as to be plane symmetric with respect to the x-z plane, the structure of the optical components in the optical system can be simplified, which allows simple designing and manufacturing processes of the optical system.

That is, by irradiating the reference beams 101 and 102 to the holographic-memory recording medium 201 so as to be asymmetric with respect to the x-z plane, an optical path length of the reference beam 101 up to the holographic-memory recording medium 201 becomes different from an optical path length of the reference beam 102 up to the holographic-memory recording medium 201. Therefore, the number of optical components arranged along the optical path length of the reference beam 101 is different from the number of optical components arranged along the optical path length of the reference beam 102, which causes the optical system to become complicated and the number of optical components to thereby increase accordingly. Thus, it is necessary to separately design optical system and separately set manufacturing processes for respective optical paths of the reference beams 101 and 102.

On the other hand, as is explained in the first embodiment, when the reference beams 101 and 102 are irradiated to the holographic-memory recording medium 201 so as to be plane symmetric with respect to the x-z plane, the optical path length of the reference beam 101 and the optical path length of the reference beam 102 are equal to each other because of the symmetry. Therefore, the optical components are simply arranged along the optical path of the reference beam 101 and that of the reference beam 102 in the symmetric manner. Thus, the optical system is designed only for an optical path length of one of the reference beams (e.g., reference beam 101), and the optical system for an optical path of the other reference beam (e.g., reference beam 102) can be obtained simply by referring to that for the one reference beam (e.g., reference beam 101), which enables the designing and manufacturing processes of the optical system to be simplified.

Further, when the reference beams 101 and 102 are irradiated to the holographic-memory recording medium 201 so as to be plane symmetric with respect to the x-z plane, the optical path length of the reference beam 101 and that of the reference beam 102 are equal to each other. Consequently, there are advantages in that the characteristics of the reference beams 101 and 102 upon recording and reproduction of information become the same as each other and the characteristics upon the $\theta_y$ multiple recording and reproduction are equivalent to each other.

Figure 2:
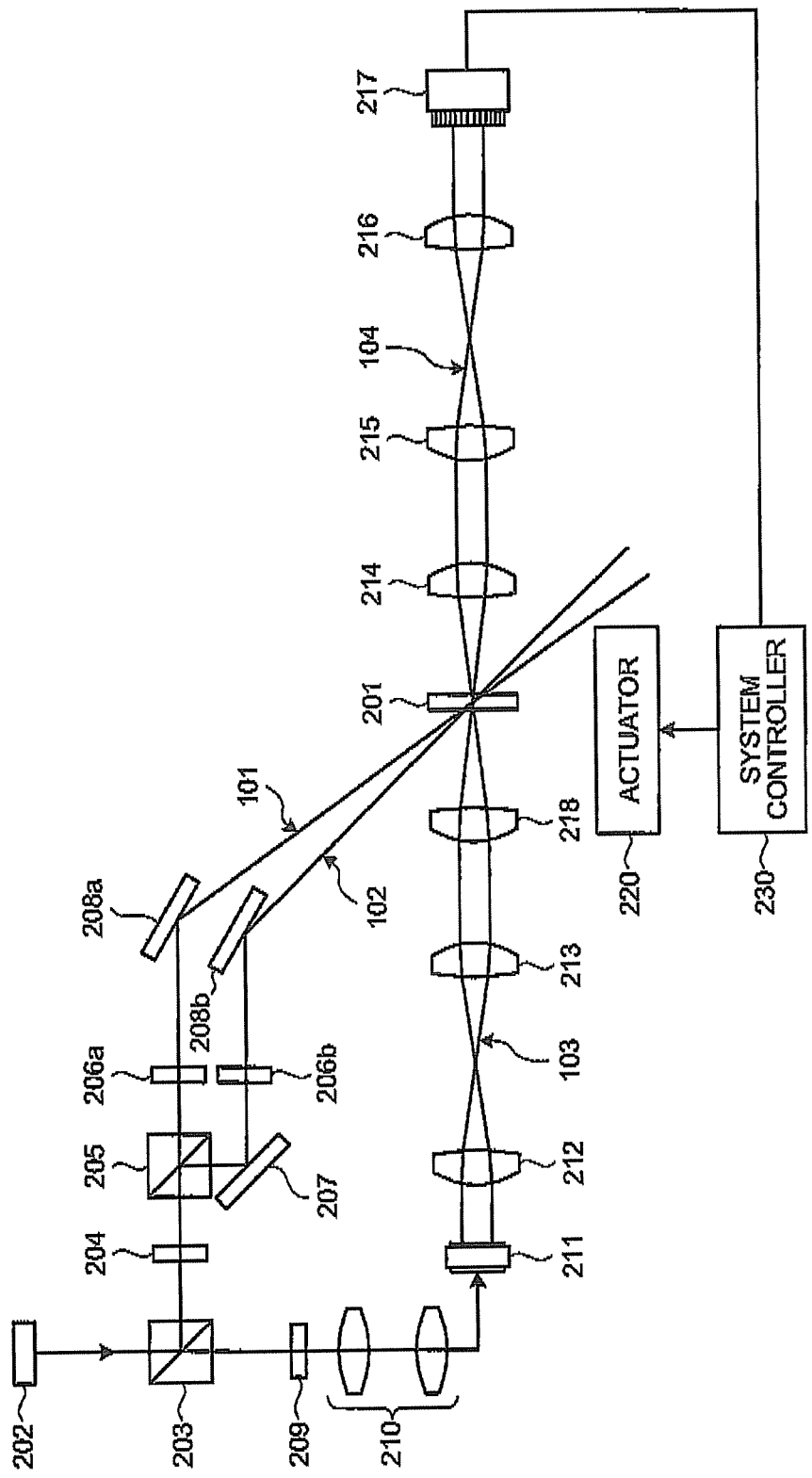
FIG. 2 is a schematic diagram of a main structure of an optical system in the holographic-memory recording/reproducing apparatus according to the first embodiment.

Next, an optical system of the holographic-memory recording/reproducing apparatus according to the first embodiment will be explained below. FIG. 2 is a schematic diagram of a main structure of the optical system of the holographic-memory recording/reproducing apparatus according to the first embodiment.

The first embodiment employs an optical system of a two-light flux system in which the information beam and the reference beam are made incident on the holographic-memory recording medium 201 through discrete lenses so as to overlap each other on the holographic-memory recording medium 201. However, the optical system is not limited to the two light flux system, and thus a colinear system may be employed as the optical system. The colinear system is such that the information beam and the reference beam are made incident on the holographic-memory recording medium 201 from the same direction through one objective lens or the like so as to share the same central axis thereof.

In FIG. 2, to avoid complication, an optical path from the light source to the spatial light modulator and an optical system including those unnecessary for explanation in the first embodiment such as a shutter, a wave plate, and a polarization beam splitter are omitted. Further, FIG. 2 shows only an optical path, necessary for explanation in the first embodiment, from splitting of the information beam 103 and the reference beams 101 and 102 from one light source to be made incident on the holographic-memory recording medium 201 to detection of a reproduction beam having passed through the holographic-memory recording medium 201 by an imaging unit 217. Angles, a positional relation, and sizes of the optical components are only schematic for convenience of explanation.

A semiconductor laser device 202 is a laser light source that emits a laser beam. Here, the semiconductor laser device 202 preferably emits a 405-nanometer wavelength blue-violet laser in terms of the degree of design freedom of the holographic-memory recording medium 201. It is noted that a shutter, an external resonator to stabilize and narrow wavelengths, and a prism to average an intensity distribution or the like are included in the semiconductor laser device 202 as needed although they are not shown herein.

In the holographic-memory recording/reproducing apparatus according to the first embodiment, the information beam 103 and the reference beams 101 and 102 are split from a laser beam emitted from the semiconductor laser device 202 as a single unit. Specifically, the laser beam emitted from the semiconductor laser device 202 is shaped, expanded, or reduced by a collimator lens (not shown) as required, and is made incident on a polarization beam splitter 203.

The laser beam incident on the polarization beam splitter 203 is split. Part of the laser beam reflected by the polarization beam splitter 203 becomes a reference beam, and part of the laser beam having passed through the polarization beam splitter 203 passes through a spatial light modulator 211 explained later to become an information beam.

The part of the laser beam having passed through the polarization beam splitter 203 becomes a P-polarized beam, and enters a relay lens 210 consisting of two lenses. In setting of the first embodiment, because the laser beam is split by the polarization beam splitter 203 with a beam diameter required as the reference beams 101 and 102, a beam diameter of the laser beam having passed through the polarization beam splitter 203 is adjusted by the relay lens 210, and is then passed through the optical components such as a mirror (not shown) to enter the spatial light modulator 211. When information is to be reproduced from the holographic-memory recording medium 201, a shutter 209 is closed, so that the information beam to enter the holographic-memory recording medium 201 is blocked. When information is to be recorded in the holographic-memory recording medium 201, the shutter 209 is opened, and the laser beam having passed through the polarization beam splitter 203 enters the relay lens 210 and the spatial light modulator 211.

The intensity of the laser beam entering the spatial light modulator 211 is two-dimensionally modulated by the spatial light modulator 211, and the laser beam is converted to the information beam 103. The spatial light modulator 211 has a binarized pattern (page data) which is formed with a large number of bright points and dark points and in which information to be recorded is digitally encoded to contain error correction. The binarized-pattern page data is formed by a system controller 230, the information beam 103 of which intensity is modulated by the page data is irradiated to the hologram recording layer of the holographic-memory recording medium 201, and a Fourier-transformed image is formed in or near the hologram recording layer.

The spatial light modulator 211 can generally use any element, such as a liquid crystal element or a digital micro-mirror device (DMD), capable of changing a transmittance, a phase, a reflection angle, and a polarization direction or the like for each pixel using electrical signals.

The information beam 103 whose intensity is modulated by the page data in the spatial light modulator 211 passes through lenses 212 and 213, is collected on the hologram recording layer of the holographic-memory recording medium 201 by the objective lens 218, to be converged and irradiated thereto. The first embodiment is structured to provide the lenses 212 and 213 between the spatial light modulator 211 and the objective lens 218, however, the structure is not limited to the above one if the optical system is formed of the optical components so that a Fourier-transformed image of the spatial light modulator 211 is formed on or near the holographic-memory recording medium 201 when information is to be recoded. For example, the lenses 212 and 213 may not be provided, or the arrangement of the optical components is not limited to the arrangement of FIG. 2, and thus, further optical components such as a lens, a mirror, a diaphragm, and a shutter may be additionally arranged. When the optical system is structured as a reproduction-only device of the holographic-memory recording medium 201, the path of the information beam and the optical components from the polarization beam splitter 203 to the holographic-memory recording medium 201 through the spatial light modulator 211 can be omitted.

Meanwhile, the part of the laser beam incident on the polarization beam splitter 203 is reflected by the polarization beam splitter 203 to be a laser beam (S-polarized beam) which is used as a reference beam. The reference beam is converted to the P-polarized beam, by a half-wave plate 204, the same as that of the information beam 103 incident on the holographic-memory recording medium 201, and enters a non-polarization beam splitter 205.

A position of the half-wave plate 204 is not limited to the position in the first embodiment if it is any position in which the reference beam as the S-polarized beam can be converted to the P-polarized beam the same as that of the information beam and irradiated to the holographic-memory recording medium 201. However, if the position is between the polarization beam splitter 203 and the non-polarization beam splitter 205 as is in the first embodiment, there are advantages in that a single half-wave plate 204 is simply provided so that the structure is simplified.

The reference beam is split into the two reference beams 101 and 102 by the non-polarization beam splitter 205.

As explained above, all the same types of optical components used for the optical paths of the two reference beams 101 and 102 are arranged plane-symmetrically with respect to the x-z plane so as to irradiate the reference beams 101 and 102 to the holographic-memory recording medium 201 plane-symmetrically with respect to the x-z plane, except for the case where any optical component is shared by the two reference beams 101 and 102. With this arrangement, the properties of the two reference beams 101 and 102 can be made identical, which enables to reduce variation in recording/reproducing of information. More specifically, in FIG. 2, the reference beam is split into the two reference beams 101 and 102 by the non-polarization beam splitter 205, and a shutter 206a and a mirror 208a being the optical components for the reference beam 101 and a shutter 206b and a mirror 208b being the optical components for the reference beam 102 are arranged plane-symmetrically with respect to the x-z plane respectively, the shutter 206a and the mirror 208a being arranged along the optical path of the split reference beam 101 up to the holographic-memory recording medium 201, and the shutter 206b and the mirror 208b being arranged along the optical path of the split reference beam 102 from a mirror 207 by which it is reflected up to the holographic-memory recording medium 201. In addition, when other optical components such as a lens, a wave plate, a polarization device, a filter, and a prism are arranged along the optical path of the reference beam 101, the same types of other optical components such as a lens, a wave plate, a polarization device, a filter, and a prism are arranged along the optical path of the reference beam 102 in one-to-one correspondence with the other optical components, plane-symmetrically with respect to the x-z plane. The plane-symmetric arrangement of the optical components is similarly applied to the following embodiments and modifications.

Irradiation and non-irradiation of the reference beams 101 and 102 are selected by the shutters 206a and 206b respectively, and an irradiation-selected one is irradiated to the holographic-memory recording medium 201.

That is, the reference beam 101 is reflected by the mirror 208a when the shutter 206a is open, is irradiated as a parallel light flux to the holographic-memory recording medium 201, and interferes with the information beam 103 in the hologram recording layer of the holographic-memory recording medium 201, so that information is recorded therein.

Meanwhile, the reference beam 102 is reflected by the mirror 207, is then reflected by the mirror 208b when the shutter 206b is open, is irradiated as a parallel light flux to the holographic-memory recording medium 201, and interferes with the information beam 103 in the hologram recording layer of the holographic-memory recording medium 201, so that information is recorded therein.

In the first embodiment, the reference beams 101 and 102 each as the parallel light flux are irradiated to the holographic-memory recording medium 201, however, they are not limited to the parallel light flux.

The opening and closing of the shutters 206a and 206b are controlled by the system controller 230. In the first embodiment, in both cases of recording and reproducing information, the two shutters 206a and 206b are not opened simultaneously, and thus, they are controlled so that when one shutter 206a (206b) is open, the other shutter 206b (206a) is closed. Therefore, the reference beams 101 and 102 are controlled by the system controller 230 so that only one of them is irradiated to the holographic-memory recording medium 201.

As the shutters 206a and 206b, any one of a mechanical shutter, an electronic shutter, and the like may be used regardless of its structure if passage and blockage of the reference beams 101 and 102 can be switched.

For example, when the shutters 206a and 206b are formed as mechanical shutters, they are simply structured to provide a drive unit so as to drive the opening and closing of the shutters 206a and 206b, and send an opening/closing drive signal from the system controller 230 to the drive unit, so that the drive unit opens or closes either one of the shutters 206a and 206b according to the opening/closing drive signal.

Further, when the shutters 206a and 206b are formed as electronic shutters, they are simply structured to send opening/closing control signals (energization/non-energization, etc.) from the system controller 230 to the shutters 206a and 206b respectively, to open or close either one of them.

Further, as the shutters 206a and 206b, any other components such as a liquid crystal element, an electrochromic element, a breaker that performs opening and closing by a motor or a solenoid or the like, a combination of a wave plate and a polarization plate, and an acousto-optic device can be used. In this case, the opening and closing of the shutters 206a and 206b are controlled by the system controller 230.

It is preferable that the shutter 206a and the mirror 208a being the optical components arranged along the optical path of the reference beam 101 up to the holographic-memory recording medium 201, and the shutter 206b and the mirror 208b being the optical components arranged along the optical path of the reference beam 102 up to the holographic-memory recording medium 201 are arranged in a substantially or optically symmetric manner with respect to a plane including a vertical line of the holographic-memory recording medium 201. This allows irradiation of the reference beams 101 and 102, which become symmetric with respect to the x-z plane, to the holographic-memory recording medium 201. The term "optically or substantially symmetric arrangement" indicates that optical characteristics as follows and a difference or the like as follows are substantially the same as each other in the reference beams 101 and 102, and that the difference between the reference beams 101 and 102 is hardly exerted on recording/reproducing characteristics. Specifically, the optical characteristics include an optical path length, a wavefront, a light intensity, light-intensity distribution, an incident angle thereof to the holographic-memory recording medium 201, and an azimuth angle thereof. The displacement or the like in the characteristics occurs due to fluctuation in temperature and fluctuation in wavelength. However, these optical components are not necessarily arranged in the substantially or optically symmetric manner with respect to the plane including the vertical line of the holographic-memory recording medium 201. Therefore, the optical components may be arranged by slightly displacing the incident angles (or, also azimuth angles) of the reference beams 101 and 102 from each other. For example, they may be arranged by displacing the angles by a half angle of an angle step of the $\theta_y$ multiple recording, to achieve reduction in crosstalk.

In the first embodiment, the mirrors 208a and 208b are provided to change the optical paths of the reference beams 101 and 102 respectively and to irradiate them to the holographic-memory recording medium 201. Therefore, if the reference beams 101 and 102 can be irradiated to the holographic-memory recording medium 201 without changing the optical paths, the optical system can be structured without the mirrors 208a and 208b.

On the other hand, if the optical paths need to be changed plural times to irradiate the reference beams 101 and 102 to the holographic-memory recording medium 201, more mirrors are simply provided in the respective optical paths thereof.

However, in both the cases, the optical components arranged along the optical path of the reference beam 101 up to the holographic-memory recording medium 201 and the optical components arranged along the optical path of the reference beam 102 up to the holographic-memory recording medium 201 are preferably arranged in the substantially or optically symmetric manner.

It is preferable that the optical path lengths from splitting of the laser beam by the polarization beam splitter 203 up to the hologram recording layer of the holographic-memory recording medium 201 are approximately equal to each other in the information beam 103 and the reference beams 101 and 102. It is more preferable that a difference between the optical path lengths is smaller than a coherence length of the semiconductor laser device 202.

The holographic-memory recording medium 201 is fixedly placed on a stage (not shown) driven by an actuator 220 as the drive unit so that the hologram recording layer is located at a focus position of the objective lens 218.

However, the position of the hologram recording layer is not necessarily limited to the focus position of the objective lens 218, and thus the position of the hologram recording layer may be displaced from the focus position.

The holographic-memory recording medium 201 according to the first embodiment is a transmission recording medium, which includes two opposed substrates and the hologram recording layer held by the two substrates and layered on the substrate. However, the holographic-memory recording medium 201 is not limited to the above one, and thus, it can be structured as a reflection medium, or it may be structured as a medium structure different from the structure if the hologram can be recorded or reproduced.

Each of the two substrates is formed of a material having optical transparency such as glass, plastic, polycarbonate, and acrylic resin. However, the material of the substrate is not limited to these materials. For example, the material of the substrate does not need to have the transparency with respect to all wavelengths of a laser beam but only has to have the transparency with respect to a wavelength of a laser beam to be used.

The hologram recording layer is made of a hologram recording material. The hologram recording material is a material on which a hologram is formed by interference between the information beam 103 and the reference beam 101 or 102. Photopolymer is generally used as the hologram recording material. The photopolymer is a photosensitive material using photo polymerization of a polymerizable compound (monomer), and generally contains monomer as a main component, a photo-polymerization initiator, and a porous matrix that functions as a role of retaining volume before and after recording, however, the material is not limited to the above ones. Any other material capable of recording or reproducing hologram such as dichromated gelatin and a photorefractive crystal can also be used as the hologram recording material. The thickness of the recording material is preferably set to about 100 micrometers or more to acquire diffraction efficiency sufficient for signal reproduction and also acquire angular resolution appropriate for angular multiplexing.

Hologram recording to the hologram recording layer of the holographic-memory recording medium 201 is performed by the optical system in the following manner. At first, the information beam 103 and the reference beam 101 or 102 are irradiated to the medium so as to overlap each other in the hologram recording layer to form interference fringes. At this time, if the hologram recording material is photopolymer, then a photo-polymerization initiator in the photopolymer absorbs photons to be activated, and activates and accelerates polymerization of monomer in a bright portion of the interference fringes. When the polymerization of the monomer progresses and the monomer in the bright portion of the interference fringes is consumed, the monomer is shifted and supplied from a dark portion of the interference fringes to the bright portion. As a result, a density difference between the bright portion and the dark portion of the interference fringes occurs. Consequently, a refractive index modulation is formed according to an intensity distribution of an interference fringe pattern and the hologram recording is performed.

In the first embodiment, when information is to be recorded in the holographic-memory recording medium 201, switching between simultaneous irradiation of the information beam 103 and the reference beam 101 (called "recording system A") and simultaneous irradiation of the information beam 103 and the reference beam 102 (called "recording system B") is performed based on opening/closing of the shutters 206a and 206b controlled by the system controller 230. If the information beam 103 is modulated with different data in the recording system A and in the recording system B, different information can be recorded.

In the first embodiment, the $\theta_y$ multiple recording for recording information is performed while the holographic-memory recording medium 201 is made to rotate around the y-axis at each angle step ($\theta_y$ rotation) by the actuator 220. The $\theta_y$ angle step mentioned here indicates unit angle for the $\theta_y$ rotation of the holographic-memory recording medium 201 (or an optical component) when the $\theta_y$ multiple recording is performed.

When the $\theta_y$ multiple recording is to be performed using the recording system A and the recording system B, it may be performed at the same angle step as each other or may be alternately performed at a slightly displaced angle from each other. When the $\theta_y$ multiple recording is alternately performed at the slightly displaced angle, there are advantages in that crosstalk can be reduced by displacing an angle by, for example, a half of the angle step in the $\theta_y$ multiple recording.

The $\theta_y$ angle step in the $\theta_y$ multiple recording needs to be set to an angle or more at which information can be reproduced separately from an adjacent page. Diffraction efficiency when the angle is displaced from a position where information is recorded by a slight angle $\Delta\theta_y$ is proportional to the square of a sinc function, and an angle (first null angle) at which the intensity of a reproduction beam first becomes null is expressed by Expression (1) as disclosed in a technical literature "Bell Syst. Tech. C. 48, 2909-(1969)". Hereafter, the first null angle is shown by $\Delta\theta_y$.

$$\Delta\theta_y = \frac{\lambda}{\pi n t} \frac{\cos\theta_s}{|\sin(\theta_r - \theta_s)|} \quad (1)$$

Where $\lambda$ is a wavelength in vacuum, n is a medium refractive index, t is a thickness of the holographic-memory recording medium 201, $\theta_s$ is a projection angle (azimuth angle from the z-axis in the x-z plane) of an incident angle of the information beam 103 in the holographic-memory recording medium 201 with respect to the x-z plane, and $\theta_r$ is a projection angle (azimuth angle from the z-axis in the x-z plane) of each incident angle of the reference beams 101 and 102 in the holographic-memory recording medium 201 with respect to the x-z plane.

Hereafter, the same goes for the followings regardless of which recording system the reference beam belongs to, unless otherwise specified. As explained above, in the first embodiment, the reference beams 101 and 102 have azimuth angles in an x-y plane. An angle of the azimuth angle is expressed as an elevation angle $\zeta_r$ in the holographic-memory recording medium 201 with respect to the x-z plane, and it is analytically determined that the first null angle $\Delta\theta_y$ indicated by Expression (1) is expressed by Expression (2).

$$\Delta\theta_y = \frac{\lambda}{\pi n t} \frac{\cos\theta_c}{|\cos\zeta_r||\sin(\theta_r - \theta_c)|} \quad (2)$$

For example, when the two reference beams 101 and 102 are used as is in the first embodiment, the azimuth angle of the reference beam 101 becomes $\theta_s$ and the elevation angle thereof becomes $\zeta_r$, and the azimuth angle of the reference beam 102 becomes $\theta_s$ and the elevation angle thereof becomes $-\zeta_r$.

To record information so as to prevent crosstalk with an adjacent page, it is necessary to perform angular multiplexing at an interval of at least about the first null angle or more. Specifically, the number of recorded pages per unit angle becomes an inverse number or less of the interval.

According to Expression (2), the denominator becomes smaller as the elevation angle $\zeta_r$ of the reference beam becomes larger, and the first null angle $\Delta\theta_y$ becomes larger. Specifically, the number of recorded pages expressed by the inverse number of the first null angle $\Delta\theta_y$ becomes smaller, and thus, if the elevation angle $\zeta_r$ becomes large, the recording density cannot be increased. When a plurality of $\theta_z$ multiple recordings is performed, the elevation angle $\zeta_r$ becomes large, and thus, the recording density decreases more than a case of $\theta_z$ one multiple recording (only $\theta_y$ multiple recording) when the elevation angle $\zeta_r=0$.

In the first embodiment, to achieve an effect to increase the recording density, the number of recorded pages has to be increased as compared with at least the $\theta_z$ one multiple recording. For example, the condition of $\theta_y$ two multiple recordings is expressed by Expression (3).

$$\Delta\theta_y(\text{two multiples}) < 2 \times \Delta\theta_y(\text{one multiple}) \quad (3)$$

Upon one multiple recording, the elevation angle $\zeta_r=0$, and therefore, the condition of the elevation angle $\zeta_r$ upon two multiple recordings requires Expression (4-1), or the condition shown by Expression (4-2) is required.

$$\cos\zeta_r > \frac{1}{2} \quad (4\text{-}1)$$

$$\zeta_r < 60[\text{deg}] \quad (4\text{-}2)$$

However, if the elevation angle $\zeta_r$ is too small, crosstalk with the adjacent page occurs in the $\theta_y$ multiple recording. This is because the information beam 103 enters not only the x-z plane but also the holographic-memory recording medium 201 with a width (spread) due to the objective lens 218. Similarly to the reference beams 101 and 102, an angle of the information beam 103 in the holographic-memory recording medium 201 with respect to the x-z plane is the elevation angle $\zeta_s$. In the case of $\theta_y$ two multiple recordings, the condition to prevent occurrence of the crosstalk is expressed by Expression (5).

$$\sin|\zeta_r| > \sin|\zeta_s| \quad (5)$$

As explained above, the conditions of the elevation angle $\zeta_r$ of the reference beams 101 and 102 upon the $\theta_y$ two multiple recordings are set as follows: an elevation angle of one of the reference beams is $\zeta_{r1}$, a maximum elevation angle within the information beam 103 on the same side as the reference beam is $\zeta_{s1}$, an elevation angle of the other reference beam is $\zeta_{r2}$, and a maximum elevation angle within the information beam on the same side as the other reference beam is $\zeta_{s2}$, and Expression (6) is obtained.

$$\sin^{-1}|\sin\zeta_{si}| < |\zeta_{ri}| < 60(\text{deg}) \quad (6)$$

where i=1 or 2.

Therefore, when the elevation angle $\zeta_{r1}$ of the reference beam 101, the elevation angle $\zeta_{r2}$ of the reference beam 102, the maximum elevation angles $\zeta_{s1}$ and $\zeta_{s2}$ of the information beam 103 satisfy Expression (6), high recording density can be achieved and occurrence of crosstalk can be prevented as compared with the case of performing only the $\zeta_y$ multiple recording. In the first embodiment, the optical components are arranged as shown in FIG. 2 so as to irradiate the holographic-memory recording medium 201 with the reference beams 101 and 102 and the information beam 103 so that the respective elevation angles $\zeta_{r1}$, $\zeta_{r2}$, $\zeta_{s1}$, and $\zeta_{s2}$ satisfy Expression (6).

In the first embodiment, because the two systems of the reference beams 101 and 102 are used, the angle steps upon irradiation of the two reference beams 101 and 102 and the information beam 103 to the holographic-memory recording medium 201 and angle conditions upon the irradiations are considered. However, even when reference beams of three systems or more are used, if the number of systems is an odd number, it is preferable that conditions should be the same as the above conditions except that a first reference beam enters the same incident plane as that of the optical axis of the information beam ($\zeta_r=0$) from the same reason as above. If the number of systems is an even number, it is preferable that conditions should be the same as the above conditions.

However, Expression (6) which is the conditions of performing multiple recording at high recording density and preventing occurrence of crosstalk is considered in the following manner. Specifically, when the number of systems of the reference beams is an odd number, the elevation angle of the first reference beam is set to $\zeta_r=0$, and in the case of the other reference beams, if a reference beam has small $|\zeta_r|$, then Expression (7) is used instead of Expression (6). If two reference beams have next small $|\zeta_r|$, then Expression (8) is used instead of Expression (6). The conditions are replaced in such a manner that Equation (6) is replaced with Equation (7) or with Equation (8) according to ascending orders of the number of systems and of a value of $|\zeta_{ri}|$. The same goes for the case in which the number of systems is an even number except that one system is set to $\zeta_r=0$.

$$\sin|\zeta_{ri}| > 2\sin|\zeta_{sj}| \quad (7)$$

where i=1 or 2, j=1 or 2, and i and j are in the same side as viewed from the x-z plane.

$$\sin|\zeta_{ri}| > 4\sin|\zeta_{sj}| \quad (8)$$

where i=1 or 2, j=1 or 2, and i and j are in the same side as viewed from the x-z plane.

In the first embodiment, the first null angle $\Delta\theta_y$ is previously calculated by Equation (2), the calculated first null angle $\Delta\theta_y$ is determined as a $\theta_y$ angle step of the $\theta_y$ multiple recording, and the $\theta_y$ angle step is stored in a memory or the like of the system controller 230. The system controller 230 reads the $\theta_y$ angle step from the memory when information is to be recorded, sends an instruction to the actuator 220 so as to $\theta_y$-rotate the holographic-memory recording medium 201 at each $\theta_y$ angle step, and performs the $\theta_y$ multiple recording.

It is noted that the first null angle $\Delta\theta_y$ may be calculated by any method other than the calculation method using Equation (2). When calculation is performed allowing for a temperature or a relation of angles among the information beam 103, the reference beam 101 or the reference beam 102, and the holographic-memory recording medium 201, any other calculation method should be used.

In the first embodiment, the $\theta_y$ angle step and the first null angle $\Delta\theta_y$ are set as the same angle to improve the recording density, however, the $\theta_y$ angle step is not limited to the first embodiment because it is simply determined based on the first null angle $\Delta\theta_y$. For example, to ensure a certain margin, the $\theta_y$ angle step may be set as certain times of the first null angle $\Delta\theta_y$. Alternatively, the $\theta_y$ angle step may be set as a sum of the first null angle $\Delta\theta_y$ and a certain angle. In addition to the structure that the $\theta_y$ angle step is set as the certain times or as the difference between certain angles with respect to the first null angle $\Delta\theta_y$, the $\theta_y$ angle step may be determined by changing a magnification or a difference between angles with respect to the first null angle $\Delta\theta_y$ according to incident angles of the reference beams 101 and 102.

When information is to be reproduced from the holographic-memory recording medium 201, the shutter 209 is closed according to the instruction sent from the system controller 230 to block the information beam 103, and only the reference beam 101 or the reference beam 102 is made incident on the holographic-memory recording medium 201. At this time, a reproduction beam 104 is emitted from the holographic-memory recording medium 201, passes through lenses 214, 215, and 216 being a reproduction optical system, and enters the imaging unit 217. The imaging unit 217 receives the reproduction beam 104, acquires a reproduced image obtained from the reproduction beam 104, converts the reproduced image to electrical signals, and sends out the signals to the system controller 230.

In the first embodiment, when information is to be reproduced from the holographic-memory recording medium 201, the system controller 230 temporally displaces opening and closing of the shutters 206a and 206b from each other, which causes the reference beams 101 and 102 to be temporally alternately irradiated to the holographic-memory recording medium 201, so that information is reproduced. The system controller 230 reads a value of the $\theta_y$ angle step from the memory, sends an instruction to the actuator 220, and reproduces information while causing the holographic-memory recording medium 201 to $\theta_y$-rotate at each $\theta_y$ angle step.

A two-dimensional image sensor such as a charge-coupled device (CCD) and a complementary metal oxide semiconductor (CMOS) can be used as the imaging unit 217. However, the imaging unit 217 is not limited to the above-mentioned structure. For example, a one-dimensional linear image sensor for scanning can be used or an image pickup tube can be used as the imaging unit 217.

Further, when information is to be reproduced, by using the reproduction optical system so that a real image of an image reproduced from the holographic-memory recording medium 201 is projected to the imaging unit 217, the reproduction optical system may be structured without the lenses 215 and 216. In addition, the arrangement of the optical components of the reproduction optical system is not limited to the above-mentioned arrangement, and thus, any other optical components such as a lens and a mirror may be additionally arranged if necessary.

Figure 3:
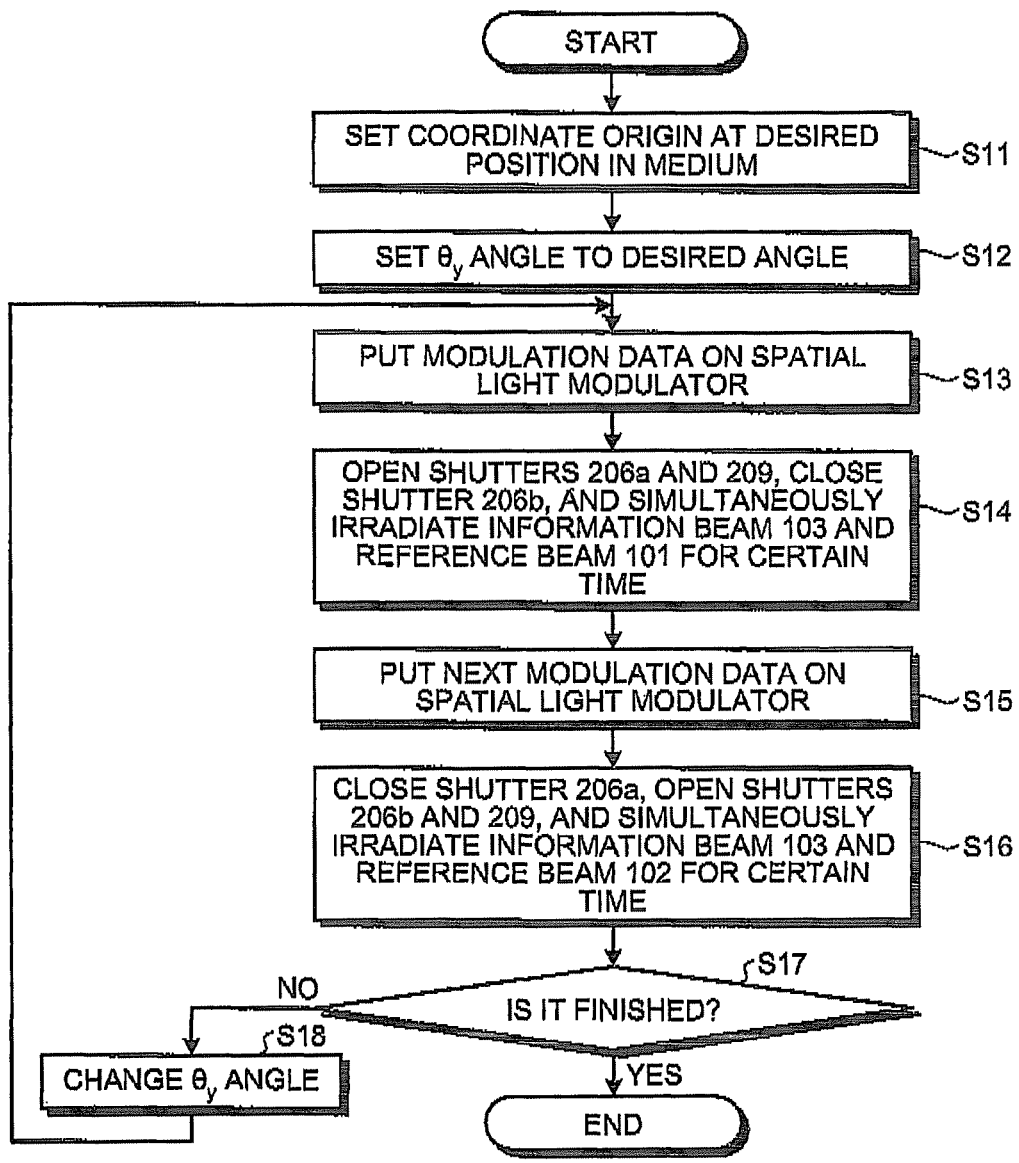
FIG. 3 is a flowchart of an information recording process according to the first embodiment.

Next, an information recording process performed by the holographic-memory recording/reproducing apparatus according to the first embodiment configured as explained above will be explained below. FIG. 3 is a flowchart of the information recording process according to the first embodiment.

First, the system controller 230 sets a coordinate origin at a desired position in the holographic-memory recording medium 201 (Step S11). Then, the system controller 230 initially sets a $\theta_y$ angle as an angle around the y-axis of the holographic-memory recording medium 201 to a desired angle (Step S12). Specifically, the system controller 230 sends an instruction to the actuator 220 to move the holographic-memory recording medium 201 at a desired angle as the $\theta_y$ angle, and the actuator 220 rotates the holographic-memory recording medium 201 by the $\theta_y$ angle according to the instruction.

Next, the system controller 230 puts modulation data on the spatial light modulator 211 (Step S13). Then, the system controller 230 opens the shutter 206a and the shutter 209, closes the shutter 206b, and causes the semiconductor laser device 202 to emit the laser beam for a certain time, to simultaneously irradiate the information beam 103 and the reference beam 101 to the holographic-memory recording medium 201 (Step S14). This causes interference to be produced between the information beam 103 and the reference beam 101, and information is thereby recorded in the hologram recording layer of the holographic-memory recording medium 201 as hologram. It is noted that it may be structured so as to change the $\theta_y$ angle after the above step.

Next, the system controller 230 puts modulation data to be recorded next on the spatial light modulator 211 (Step S15). Then, the system controller 230 closes the shutter 206a, opens the shutter 206b and the shutter 209, and causes the semiconductor laser device 202 to emit the laser beam for a certain time, to simultaneously irradiate the information beam 103 and the reference beam 102 to the holographic-memory recording medium 201 (Step S16). Thus, the irradiation of the reference beam 101 at Step S14 is switched to the irradiation of the reference beam 102. The interference is produced between the information beam 103 and the reference beam 102, and information is thereby recorded in the hologram recording layer of the holographic-memory recording medium 201 as hologram.

When recording of all the data is not finished (NO at Step S17), the system controller 230 acquires the $\theta_y$ angle step stored in the memory, sends a drive instruction to the actuator 220 so as to cause the holographic-memory recording medium 201 to $\theta_y$-rotate by the $\theta_y$ angle step to change the $\theta_y$ angle (Step S18). Thereafter, the processes from Steps S13 to S16 are repeated. At Step S17, when the recording of all the data is finished (YES at Step S17), then the processes are completed.

It is noted that the recording process can be executed by combining shift multiple recording with the $\theta_y$ multiple recording. In this case, the $\theta_y$ multiple recording is performed in the above procedure, and then the coordinate origin can be moved. Alternatively, a method of repeating the procedure for repeating movement of the coordinate origin after recording is performed at one $\theta_y$ angle and recording information while the $\theta_y$ angle is changed to again move the coordinate origin may be used, or a method of any other combination may be used.

Figure 4:
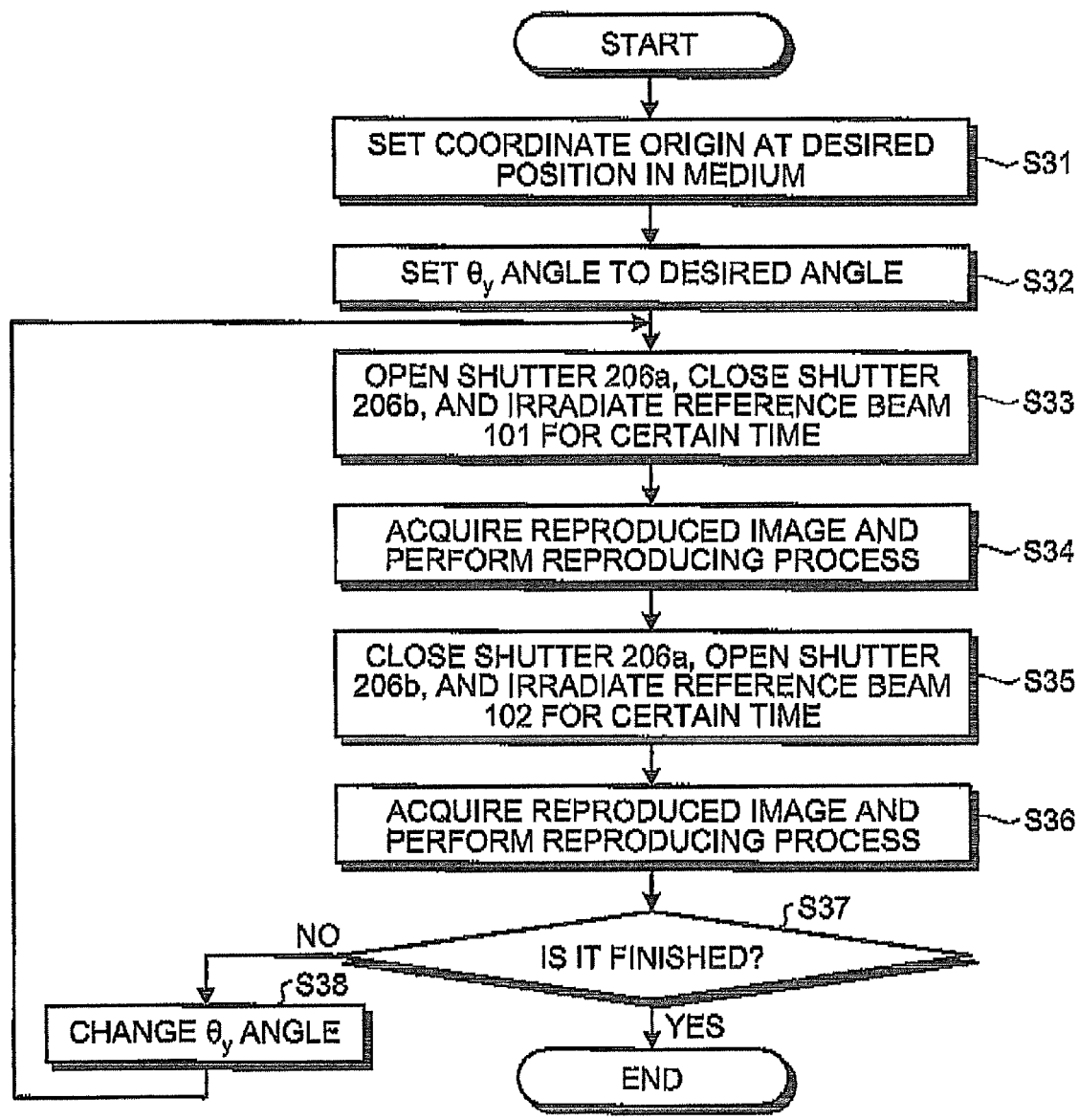
FIG. 4 is a flowchart of an information reproducing process according to the first embodiment.

Next, an information reproducing process performed by the holographic-memory recording/reproducing apparatus according to the first embodiment will be explained below. FIG. 4 is a flowchart of the information reproducing process according to the first embodiment. It is assumed that the shutter 209 is previously closed and the information beam 103 is prevented from being irradiated to the holographic-memory recording medium 201.

First, the system controller 230 sets the coordinate origin at a desired position in the holographic-memory recording medium 201 (Step S31). Then, the system controller 230 initially sets a $\theta_y$ angle to a desired angle (Step S32).

Next, the system controller 230 opens the shutter 206a, closes the shutter 206b, and causes the semiconductor laser device 202 to emit the laser beam for a certain time, to irradiate only the reference beam 101 to the holographic-memory recording medium 201 (Step S33). Then, the system controller 230 acquires a reproduced image through the imaging unit 217 and performs the reproducing process thereon (Step S34). Thereafter, it may be structured so as to change the $\theta_y$ angle.

Next, the system controller 230 closes the shutter 206a, opens the shutter 206b, and causes the semiconductor laser device 202 to emit the laser beam for a certain time, to irradiate only the reference beam 102 to the holographic-memory recording medium 201 (Step S35). This switches the irradiation of the reference beam 101 at Step S33 to the irradiation of the reference beam 102. Then, the system controller 230 acquires a reproduced image through the imaging unit 217 and performs the reproducing process thereon (Step S36).

When reproduction of all the data is not finished (NO at Step S37), the system controller 230 acquires the $\theta_y$ angle step stored in the memory, sends a drive instruction to the actuator 220 so as to $\theta_y$-rotate the holographic-memory recording medium 201 by the $\theta_y$ angle step to change the $\theta_y$ angle (step S38). Thereafter, the processes from Steps S33 to S36 are repeated. At Step S37, when the reproduction of all the data is finished (YES at Step S37), then the processes are completed.

In the first embodiment, when information is recorded by performing the $\theta_y$ multiple recording combined with the shift multiplexing recording, reproduction is simply performed using the same method as explained in the procedure for recording information, however, the combination is not necessarily the same as that used upon recording.

As explained above, in the holographic-memory recording/reproducing apparatus according to the first embodiment, the $\theta_y$ multiple recording is performed by switching between the reference beams 101 and 102 and irradiating one of them to the holographic-memory recording medium 201. Therefore, it is possible to achieve multiple recording corresponding to the $\theta_y$ multiple recording with a comparatively simple structure, prevent occurrence of crosstalk, and improve higher recording density while the device structure is made simpler.

Next, a second embodiment of the present invention will be explained below. In the first embodiment, the value of the $\theta_y$ angle step for the $\theta_y$ rotation is previously determined. However, in a holographic-memory recording/reproducing apparatus according to the second embodiment, a value of a $\theta_y$ angle step is dynamically determined to be used for the $\theta_y$ rotation.

The optical structure of the holographic-memory recording/reproducing apparatus according to the second embodiment is the same as that of the first embodiment as explained with reference to FIG. 2. In the second embodiment, the recording process and the reproducing process of information performed by the system controller 230 are different from these of the first embodiment.

Figure 5:
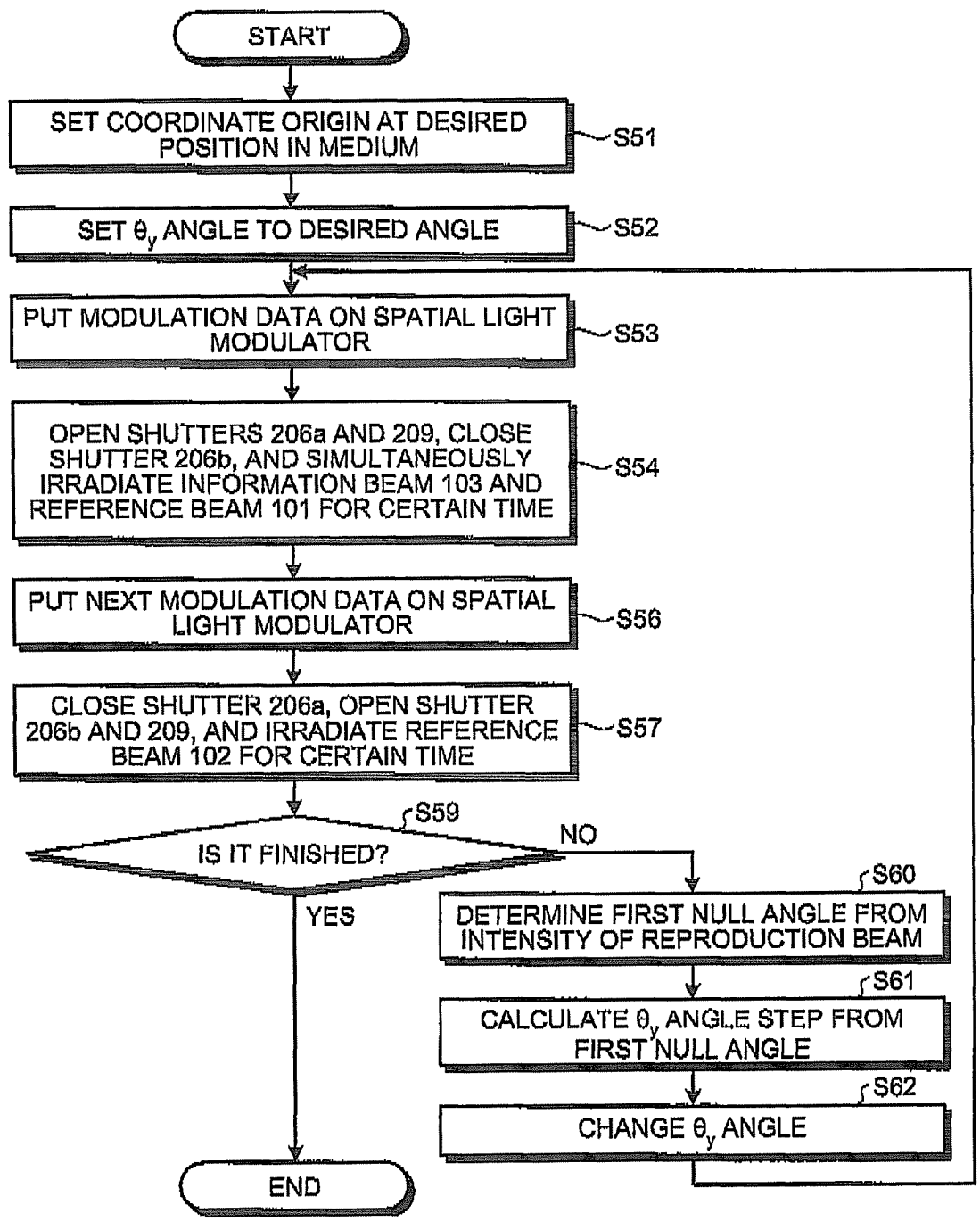
FIG. 5 is a flowchart of an information recording process according to the second embodiment.

FIG. 5 is a flowchart of an information recording process according to the second embodiment. The processes at Step S51 to Step S54 are performed in the same manner as the information recording process according to the first embodiment.

Next, the system controller 230 puts modulation data to be recorded next on the spatial light modulator 211 (Step S56). Then, the system controller 230 closes the shutter 206a, opens the shutter 206b and the shutter 209, and causes the semiconductor laser device 202 to emit the laser beam for a certain time, to simultaneously irradiate the information beam 103 and the reference beam 102 to the holographic-memory recording medium 201 (Step S57).

When recording of all the data is not finished (NO at Step S59), the system controller 230 determines an angle, as a first null angle $\Delta\theta y$, at which the intensity of a reproduction beam becomes minimal from a reproduced image acquired while changing the $\theta_y$ angle by a slight amount (Step S60) The system controller 230 calculates the $\theta_y$ angle step from the determined first null angle $\Delta\theta_y$ (Step S61). Specifically, in the second embodiment, the system controller 230 sets the first null angle $\Delta\theta_y$ as the $\theta_y$ angle step. Then, the system controller 230 causes the holographic-memory recording medium 201 to $\theta_y$-rotate by the set $\theta_y$ angle step to change the $\theta_y$ angle (Step S62). Thereafter, the processes from Steps S53 to S57 are repeated. At Step S59, when the recording of all the data is finished (YES at Step S59), then the processes are completed.

Figure 6:
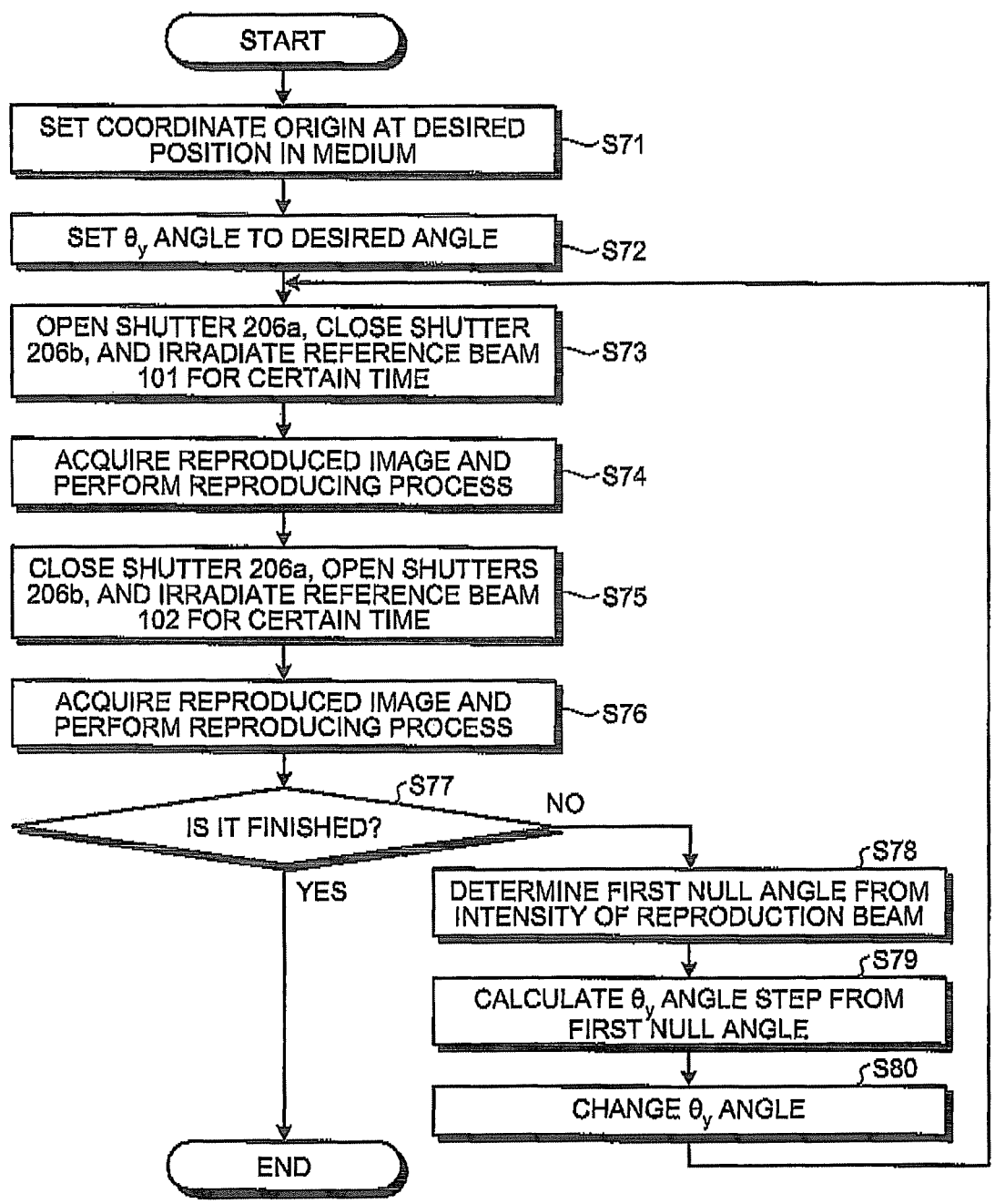
FIG. 6 is a flowchart of an information reproducing process according to the second embodiment.

Next, an information reproducing process performed by the holographic-memory recording/reproducing apparatus according to the second embodiment will be explained below. FIG. 6 is a flowchart of the information reproducing process according to the second embodiment. In the second embodiment also, it is assumed that the shutter 209 is previously closed and the information beam 103 is prevented from being irradiated to the holographic-memory recording medium 201.

The processes at Step S71 to Step S76 are performed in the same manner as these in the information reproducing process according to the first embodiment. At Step S77, when reproduction of all the data is not finished (NO at Step S77), similarly to the recording process, the system controller 230 determines an angle, as a first null angle $\Delta\theta_y$, at which the intensity of a reproduction beam becomes minimal from a reproduced image acquired while changing the $\theta_y$ angle by a slight amount (Step S78), and calculates the $\theta_y$ angle step from the determined first null angle $\Delta\theta_y$ (Step S79). Then, the system controller 230 causes the holographic-memory recording medium 201 to $\theta_y$-rotate by the $\theta_y$ angle step to change the $\theta_y$ angle (Step S80). Thereafter, the reproducing processes from Steps S73 to S76 are repeated. At Step S77, when the reproduction of all the data is finished (YES at Step S77), then the processes are completed.

If the first null angles $\Delta\theta_y$ are different from each other depending on pixels in a page, the maximum first null angle $\Delta\theta_y$ of them is simply used as the $\theta_y$ angle step.

Moreover, a first null angle $\Delta\theta_y$ may be detected by using a page while information is being recorded therein, or a first null angle $\Delta\theta_y$ may be determined by recording detection data in a preset position of the hologram recording layer of the holographic-memory recording medium 201 and reproducing the detection data. In this case, when the detection data is to be recorded, the same laser beam and laser wavelength as these used for recording of information are not necessarily used.

As explained above, in the holographic-memory recording/reproducing apparatus according to the second embodiment, the first null angle $\Delta\theta_y$ is determined from the reproduction beam, and the $\theta_y$ angle step is dynamically calculated from the determined first null angle $\Delta\theta_y$ at the processing stage at which the information is recorded or reproduced. Therefore, even if the first null angle $\Delta\theta_y$ is changed due to a change in temperature or an error or the like in thicknesses of the hologram recording layer, the first null angle can be adequately detected as compared with the case of using the previously calculated $\theta_y$ angle step, and, as a result, the $\theta_y$ angle step can be appropriately calculated. Thus, according to the second embodiment, information recording or information reproduction can be highly accurately performed.

In the second embodiment, the $\theta_y$ angle step is calculated based on the first null angles $\Delta\theta_y$, however, the calculation method is not limited thereto. For example, the $\theta_y$ angle step may be calculated based on a second null angle, or may be calculated based on an angle at which the intensity of a reproduction beam becomes a half of its peak. Further, upon reproduction, an angle at which the intensity of a reproduction beam becomes maximal is determined from a reproduced image acquired while changing the $\theta_y$ angle by a slight amount, and the angle may be set as a $\theta_y$ angle step.

Furthermore, a shift step used upon shift multiplexing can be determined by a method similar to the above method. For example, the shift step may be calculated based on a diameter of the information beam 103 in the hologram recording layer or based on a diameter of the information beam 103 at a focus position. Alternatively, the shift step may be determined based on an angle at which the intensity of the reproduction beam becomes minimal by changing a shift amount while reproducing the recorded data.

Next, a third embodiment of the present invention will be explained below. In the first and the second embodiments, when information is to be reproduced form the holographic-memory recording medium 201, the reference beam 101 and the reference beam 102 are alternately switched to be irradiated to the holographic-memory recording medium 201. However, in the third embodiment, when information is to be reproduced, the reference beam 101 and the reference beam 102 are simultaneously irradiated to the holographic-memory recording medium 201.

Figure 7:
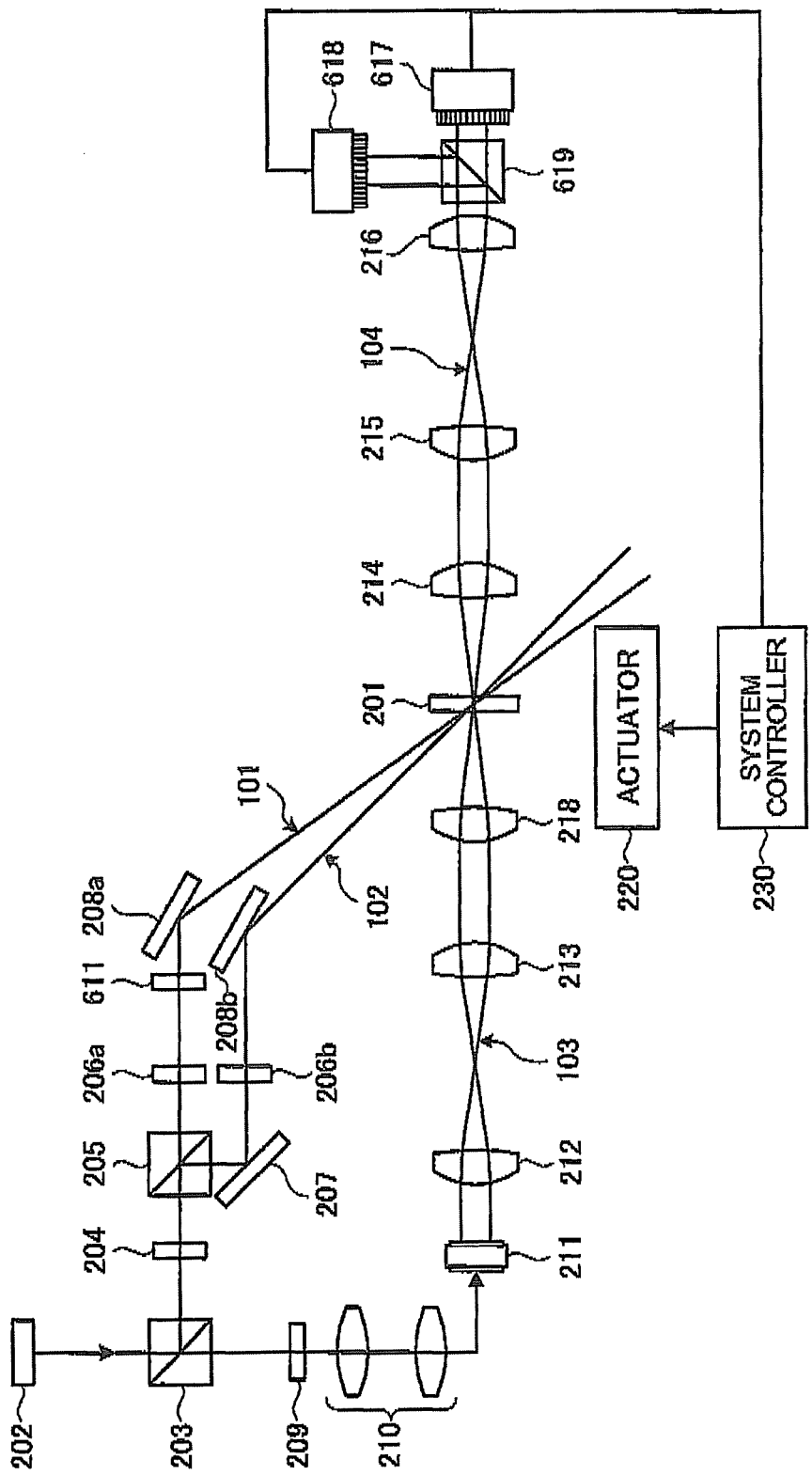
FIG. 7 is a schematic diagram of a main structure of an optical system in the holographic-memory recording/reproducing apparatus according to the third embodiment.

FIG. 7 is a schematic diagram of a main structure of an optical system in the holographic-memory recording/reproducing apparatus according to the third embodiment. In the third embodiment, the recording optical system is different from the first embodiment in that a half-wave plate 611 is provided between the shutter 206a and the mirror 208a in the optical path of the reference beam 101.

When information is to be recorded, the half-wave plate 611 causes the reference beams 101 and 102 to be polarized in the same polarization direction as that of the information beam 103, while when information is to be reproduced, the polarization directions are switched to those so that the reference beam 101 and the reference beam 102 are orthogonal to each other.

It is noted that, in the third embodiment, the half-wave plate 611 is provided in the optical path of the reference beam 101, however, it may be provided in the optical path of the reference beam 102.

Further, in the third embodiment, a polarization beam splitter 619 and imaging units 617 and 618 are arranged in the reproduction optical system, which is different from the first embodiment.

The polarization beam splitter 619 is an optical component that splits the reproduction beam into a reproduction beam obtained from the reference beam 101 and a reproduction beam obtained from the reference beam 102. The imaging units 617 and 618 receive the split reproduction beams respectively. Specifically, the reproduction beam obtained from the reference beam 101 is received by the imaging unit 618, and the reproduction beam obtained from the reference beam 102 is received by the imaging unit 617.

Next, an information reproducing process performed by the holographic-memory recording/reproducing apparatus according to the third embodiment configured in the above manner will be explained below. It is noted that the information recording process is the same as that of the first embodiment. However, when information is to be recorded, the system controller 230 controls the half-wave plate 611 so that the polarization direction of the reference beam passing through the half-wave plate 611 is set to the same direction as that of the information beam.

Figure 8:
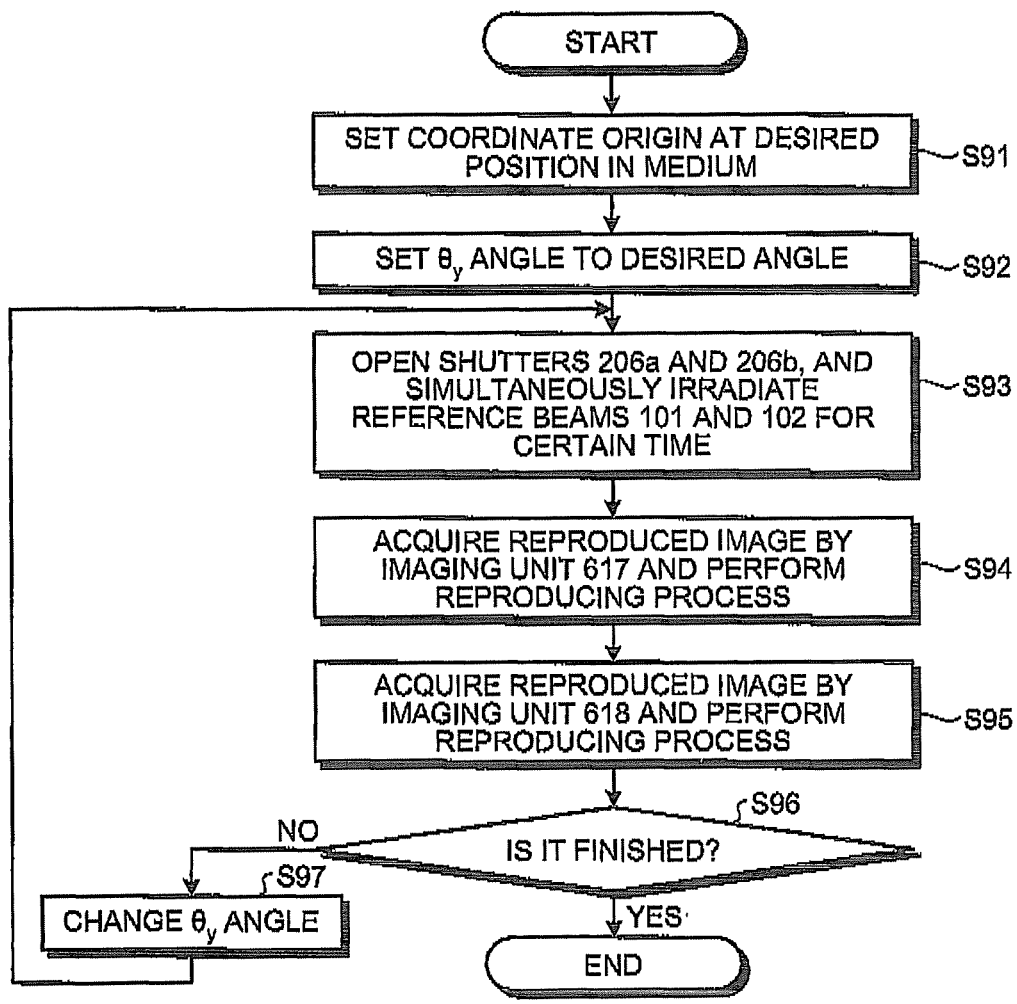
FIG. 8 is a flowchart of an information reproducing process according to the third embodiment.

FIG. 8 is a flowchart of the information reproducing process according to the third embodiment. When the polarization directions of the reference beam 101 and the reference beam 102 are not orthogonal to each other, it is necessary to previously control the half-wave plate 611 to cause the polarization directions of the reference beam 101 and the reference beam 102 to be orthogonal to each other. The processes at Steps S91 and S92 are performed in the same manner as the reproducing process according to the first embodiment. The system controller 230 sets the $\theta_y$ angle to a desired angle, then opens both the shutters 206a and 206b, and causes the semiconductor laser device 202 to emit the laser beam, to simultaneously irradiate the reference beam 101 and the reference beam 102 to the holographic-memory recording medium 201 (Step S93). The system controller 230 acquires a reproduced image obtained from the reference beam 102 of the reproduction beam through the imaging unit 617, and performs the reproducing process thereon (Step S94). At the same time, the system controller 230 acquires a reproduced image obtained from the reference beam 101 of the reproduction beam through the imaging unit 618, and performs the reproducing process thereon (Step S95).

When reproduction of all the data is not finished (NO at Step S96), similarly to the first embodiment, the system controller 230 changes the $\theta_y$ angle by the $\theta_y$ angle step (Step S97), and the processes from Steps S93 to S95 are repeated. At Step S96, when the reproduction of all the data is finished (YES at Step S96), then the processes are completed.

As explained above, in the third embodiment, information is reproduced by simultaneously irradiating the reference beam 101 and the reference beam 102 to the holographic-memory recording medium 201, and thus, page data for two pages recorded in the hologram recording layer can be reproduced at a time. As a result, according to the third embodiment, a reproduction transfer rate can be doubled.

In the third embodiment, the structure in which the reference beams 101 and 102 are simultaneously irradiated is applied to the structure according to the first embodiment. However, in addition to this, the structure may be applied to the second embodiment or to subsequent modifications.

In the embodiments, the optical components are arranged so that the reference beams 101 and 102 upon reproduction of information enter the holographic-memory recording medium 201 from the same direction and along the same optical paths as these of the reference beams 101 and 102 upon recording of information. However, the arrangement is not limited thereto.

Figure 9:
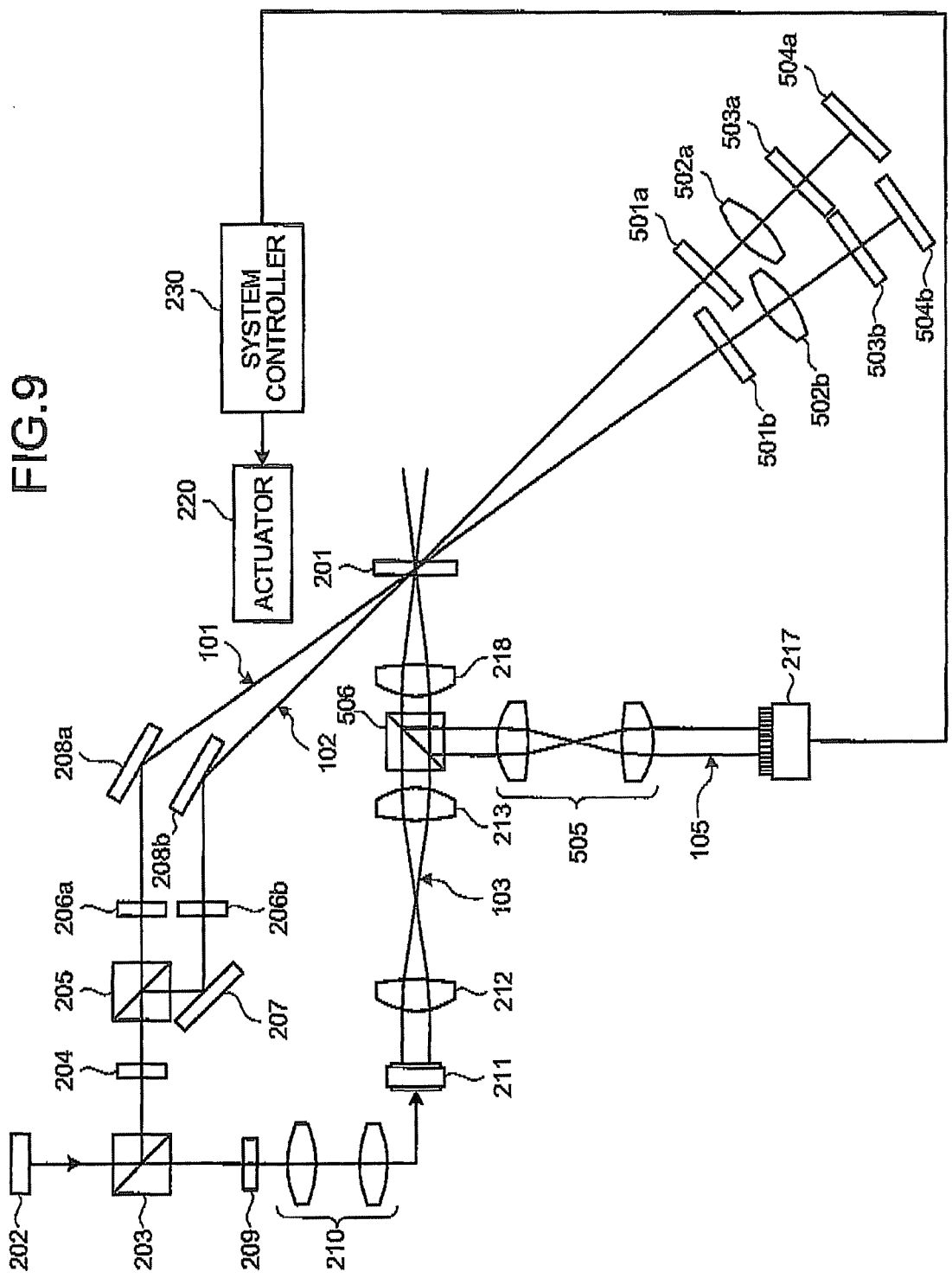
FIG. 9 is a schematic diagram of a main structure of an optical system in a holographic-memory recording/reproducing apparatus according to a first modification of the present invention.

For example, as a first modification according to the present invention, optical components may be arranged so as to cause the reference beam upon reproduction of information to be incident on the holographic-memory recording medium 201 from a direction opposite to the reference beam upon recording of information. In this case, as shown in FIG. 9, for example, mirrors 504a and 504b for reflecting the reference beams 101 and 102 to the opposite side to the incident side of the reference beams 101 and 102 on the holographic-memory recording medium 201 are provided. Further, quarter-wave plates 503a and 503b, lenses 502a and 502b, and shutters 501a and 501b are provided as needed. A polarization beam splitter 506 and a relay lens 505 are further provided so that a reproduction beam reproduced from the holographic-memory recording medium 201 passes through at least the objective lens 218 in an opposite direction to a traveling direction of the information beam 103 to obtain a reproduced image, and a reproduction beam 105 is guided to the imaging unit 217. The reproduction optical system using phase conjugation is thereby structured. Thus, the condition required for the objective lens 218 to collect the information beam 103 can be eased and a simple optical structure is also achieved so that the lenses 214, 215, and 216 of the reproduction optical system according to the first embodiment become unnecessary.

In this case, all the optical components arranged along the respective optical paths of the reference beams 101 and 102 emitted from the holographic-memory recording medium 201 are arranged plane-symmetrically with respect to the x-z plane except for the case where any optical component is shared by the two reference beams 101 and 102. Specifically, in FIG. 9, the shutter 501a, the lens 502a, the quarter-wave plate 503a, and the mirror 604a which are the optical components provided along the optical path of the reference beam 101, and the shutter 501b, the lens 502b, the quarter-length plate 503b, and the mirror 504b which are the optical components provided along the optical path of the reference beam 102 are arranged plane-symmetrically with respect to the x-z plane, respectively. In addition, when other optical components such as a polarization device, a filter, and a prism are arranged along the optical path of the reference beam 101, the same types of other optical components such as a polarization device, a filter, and a prism are arranged along the optical path of the reference beam 102 in one-to-one correspondence with the other optical components, plane-symmetrically with respect to the x-z plane. With this arrangement, the properties of the two reference beams 101 and 102 can be made identical, which enables to reduce variation in recording/reproducing of information. It is noted that a wavefront correcting unit using a liquid crystal and a deformable mirror or the like may be provided between the holographic-memory recording medium 201 and the mirrors 504a and 504b for reflecting the reference beam on the other side of the holographic-memory recording medium 201, or may be provided on the mirrors 504a and 504b themselves. This case allows reproduction with higher accuracy. Further, some other optical components may be arranged so that the reference beam 101 and the reference beam 102 are not reflected using the mirrors 504a and 504b but a reference beam in another optical path can be irradiated to the holographic-memory recording medium 201 from the other side thereof, and reproduction due to the phase conjugation may be performed using the arrangement.

A second modification according to the present invention is structured to add a function of shutters to the mirrors 208a and 208b according to the first embodiment so that they function as movable mirrors, instead of the shutters 206a and 206b according to the first embodiment.

Figure 10:
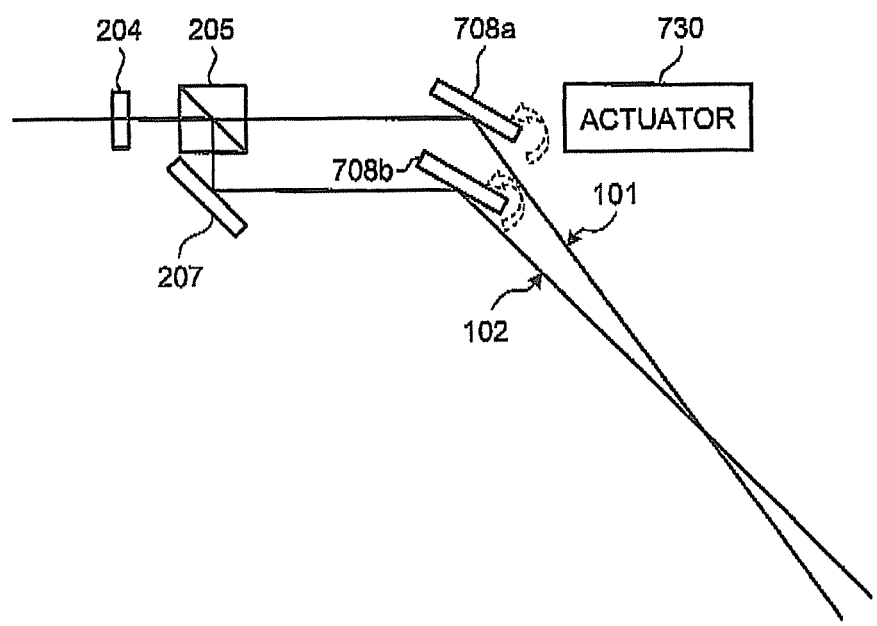
FIG. 10 is a schematic diagram of an optical structure from splitting of a reference beam to entering thereof into a holographic-memory recording medium according to a second modification of the present invention.

FIG. 10 is a schematic diagram of the structure of optical components according to the second modification from splitting of a reference beam by the polarization beam splitter 203 to entering thereof into the holographic-memory recording medium 201. The second modification is configured so that movable mirrors 708a and 708b for changing respective optical paths of the reference beams 101 and 102 to be irradiated to the holographic-memory recording medium 201 are driven by an actuator 730 and reflection directions can be changed. The reflection directions of the reference beams 101 and 102 are changed by the movable mirrors 708a and 708b, which allows switching between irradiation of the reference beam 101 to the holographic-memory recording medium 201 and irradiation of the reference beam 102 thereto. The shutters become thereby unnecessary, and the device structure becomes simpler.

Figure 11:
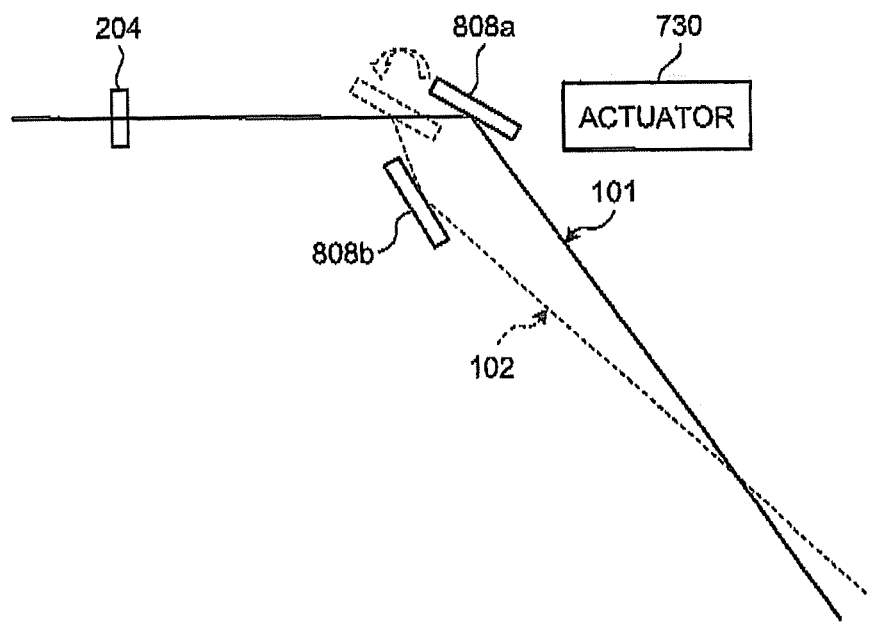
FIG. 11 is a schematic diagram of an optical structure from splitting of a reference beam to entering thereof into a holographic-memory recording medium according to a third modification of the present invention.

As shown in FIG. 11, a third modification according to the present invention may be configured so that irradiations of the reference beams 101 and 102 are switched only by a movable mirror 808a. Specifically, in the structure including the movable mirror 808a and a mirror 808b, the position of the movable mirror 608a is moved by the actuator 730 to switch between irradiation of only the reference beam 101 to the holographic-memory recording medium 201 and irradiation of only the reference beam 102 thereto. It is noted that the half-wave plate 204 is used to adjust the polarization directions of the reference beams 101 and 102 to the polarization direction of the information beam 103. The third modification has also advantages in that the shutters become unnecessary.

Figure 12:
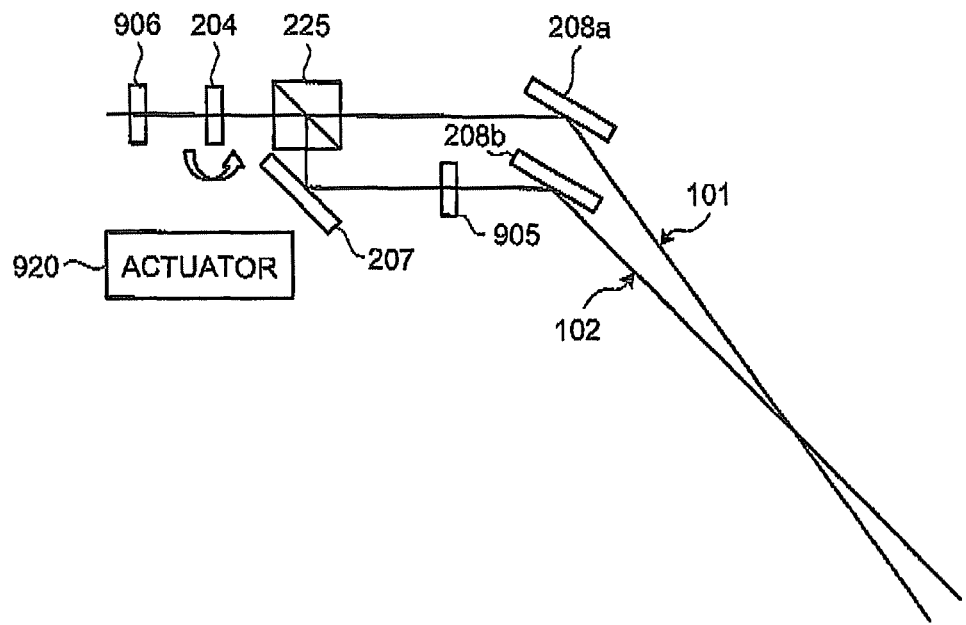
FIG. 12 is a schematic diagram of an optical structure from splitting of a reference beam to entering thereof into a holographic-memory recording medium according to a fourth modification of the present invention.

As shown in FIG. 12, a fourth modification according to the present invention may be configured so that the half-wave plate 204 is rotatably provided and is rotated by an actuator 920, to thereby switch between reference-beam emitting directions of a polarization beam splitter 225. The switching between the reference-beam emitting directions of the polarization beam splitter 225 allows switching between irradiation of the reference beam 101 to the holographic-memory recording medium 201 and irradiation of the reference beam 102 thereto. Thus, the fourth modification has advantages in that the shutter becomes unnecessary and light use efficiency is improved.

A half-wave plate 905 is used to adjust the polarization directions of the reference beam 101 and 102 to the polarization direction of the information beam 103.

Figure 13:
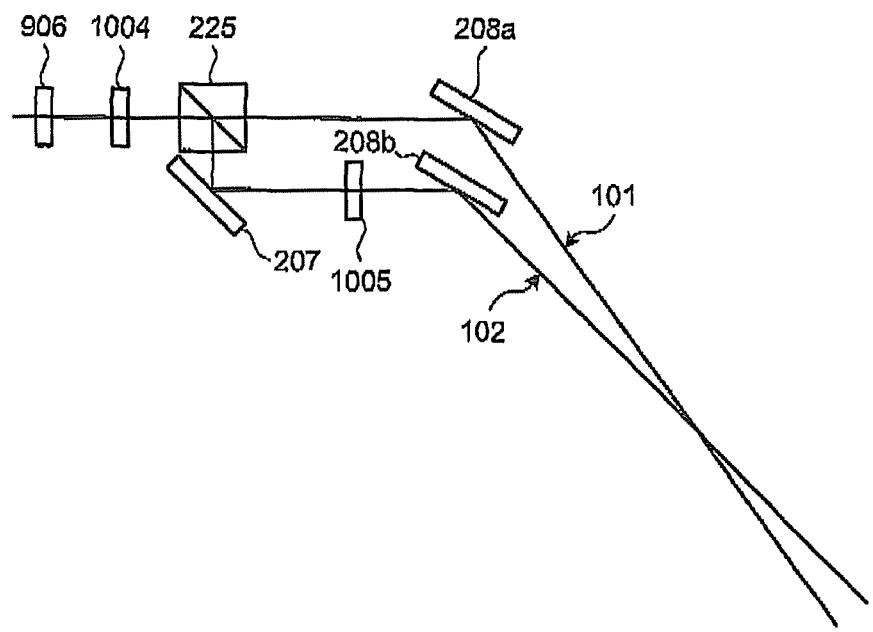
FIG. 13 is a schematic diagram of an optical structure from splitting of a reference beam to entering thereof into a holographic-memory recording medium according to a fifth modification of the present invention.

As shown in FIG. 13, a fifth modification according to the present invention uses a liquid crystal plate 1004 instead of the rotatable half-wave plate 204 in the fourth modification. The liquid crystal plate 1004 has characteristics in which a change in voltage to be applied thereto causes a polarization direction to change. Therefore, the system controller 230 controls a voltage to be applied to the liquid crystal plate 1004 to change the polarization direction of the reference beam, which allows switching between irradiation of the reference beam 101 to the holographic-memory recording medium 201 and irradiation of the reference beam 102 thereto. Thus, the fifth modification has advantages in that the movable portion can be omitted and the device structure becomes thereby simplified.

It is noted that some other device such as a magneto-optical device that can change a polarization direction due to magnetism may be used instead of the liquid crystal plate 1004. A half-wave plate 1005 is used to adjust the polarization directions of the reference beam 101 and 102 to the polarization direction of the information beam 103.

Figure 14:
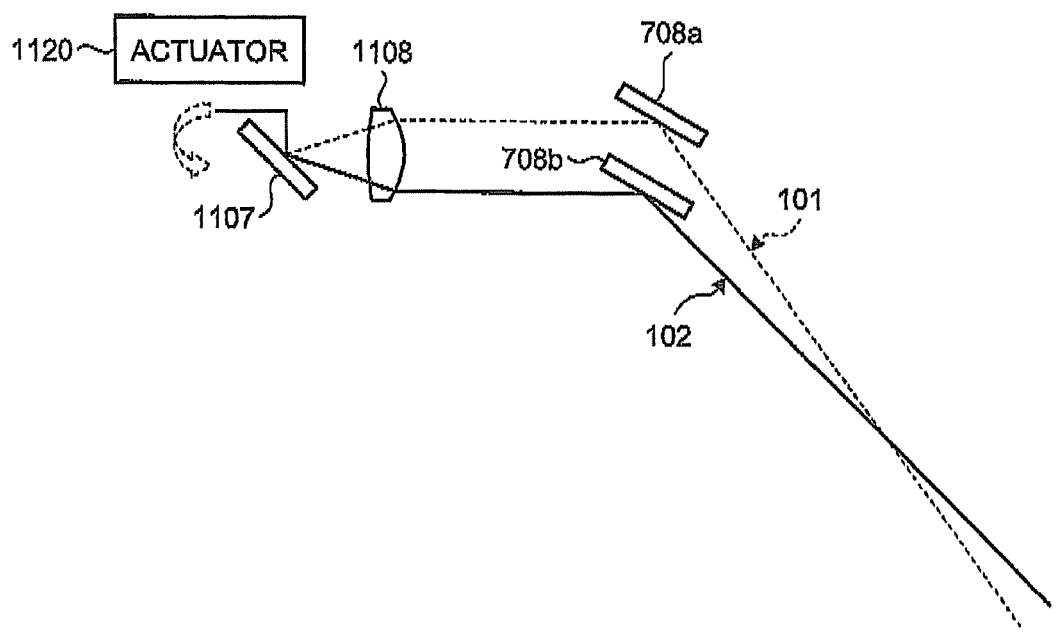
FIG. 14 is a schematic diagram of an optical structure from splitting of a reference beam to entering thereof into a holographic-memory recording medium according to a sixth modification of the present invention.

As shown in FIG. 14, in a sixth modification according to the present invention, a movable mirror 1107 and a lens 1108 may be used to switch irradiations between the reference beams 101 and 102. Specifically, the movable mirror 1107 is actuated by an actuator 1120 to switch between the reflection directions of the reference beams. This switching causes the reference beams reflected in different directions to be irradiated to the holographic-memory recording medium 201 through the lens 1108 and the mirrors 708a and 708b, to thereby switch between irradiation of the reference beam 101 to the holographic-memory recording medium 201 and irradiation of the reference beam 102 thereto. Thus, the sixth modification has advantages in that a difference between the optical path lengths of the reference beams can be made smaller as compared with that of the fourth modification.

Figure 15:
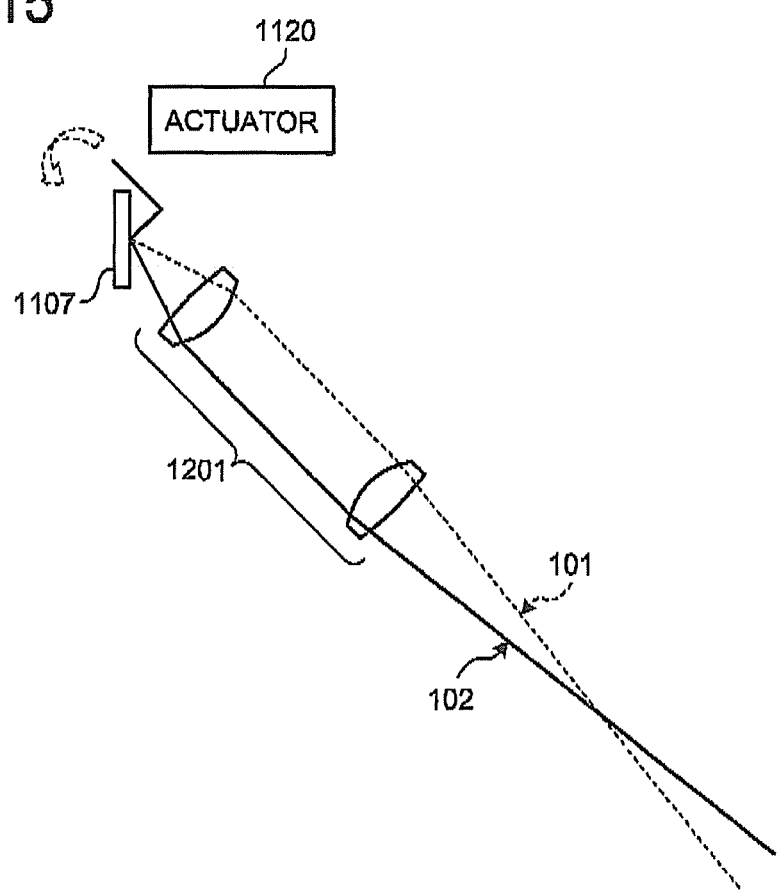
FIG. 15 is a schematic diagram of an optical structure from splitting of a reference beam to entering thereof into a holographic-memory recording medium according to a seventh modification of the present invention.

As shown in FIG. 15, in a seventh modification according to the present invention, the movable mirror 1107 and a relay lens 1201 are provided, and the movable mirror 1107 is actuated by the actuator 1120 to change the reflection directions of the reference beams. The reference beams reflected in different directions are caused to be irradiated to the holographic-memory recording medium 201 through the relay lens 1201, to thereby switch between irradiation of the reference beam 101 to the holographic-memory recording medium 201 and irradiation of the reference beam 102 thereto. The seventh modification has advantages in that wavefronts of the reference beams 101 and 102 are easily made to be plane waves because the relay lens 1201 is used.

The embodiments and the modifications explain the case where the two systems of the reference beams are used, however, the present invention is also applicable to a case where three systems or more of reference beams are used. For example, the number of beam splitters, mirrors, and shutters or the like is simply added according to the number of systems as needed. When the movable mirror is used, the number of steps for actuation is simply added by a required number according to the number of systems.

Furthermore, in the embodiments and the modifications, the $\theta_y$ multiple recording is performed by $\theta_y$-rotating the holographic-memory recording medium 201, however, an eighth modification according to the present invention may perform the $\theta_y$ multiple recording by changing each angle of irradiation of the reference beams 101 and 102.

Figure 16:
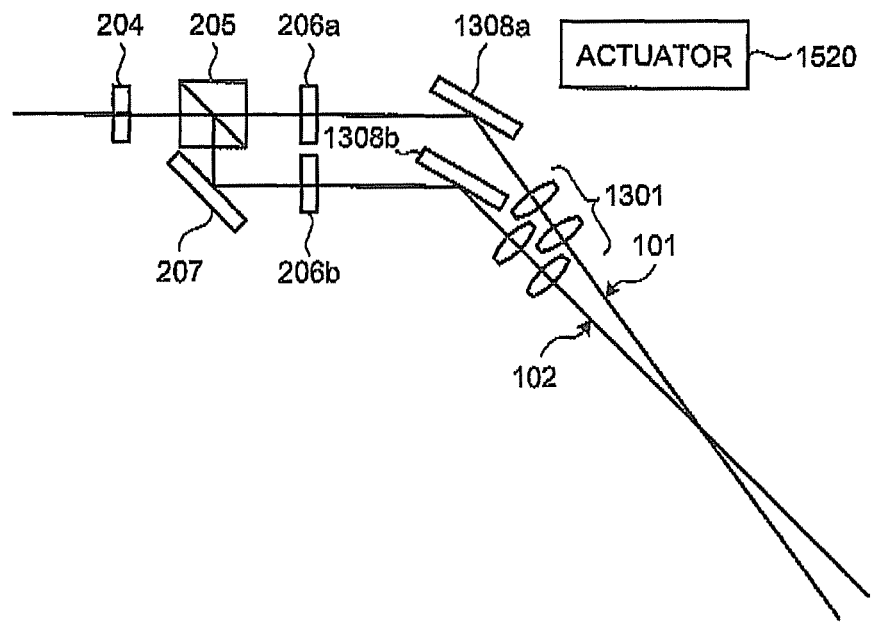
FIG. 16 is a schematic diagram of an optical structure from splitting of a reference beam to entering thereof into a holographic-memory recording medium according to a eighth modification of the present invention.

In this case, as shown in FIG. 16, movable mirrors 1308a and 1308b, obtained by adding a rotation mechanism to the mirrors 208a and 208b of the first embodiment, are used, and the movable mirrors 1308a and 1308b are caused to rotate by an actuator 1520, which causes the reference beams 101 and 102 to rotate at each $\theta_y$ angle step. Here, a relay lens 1301 is an optical component used so that a position of interference with the information beam 103 is not displaced when incident angles of the reference beams 101 and 102 are changed caused by changes in angles of the movable mirrors 1308a and 1308b.

Figure 17:
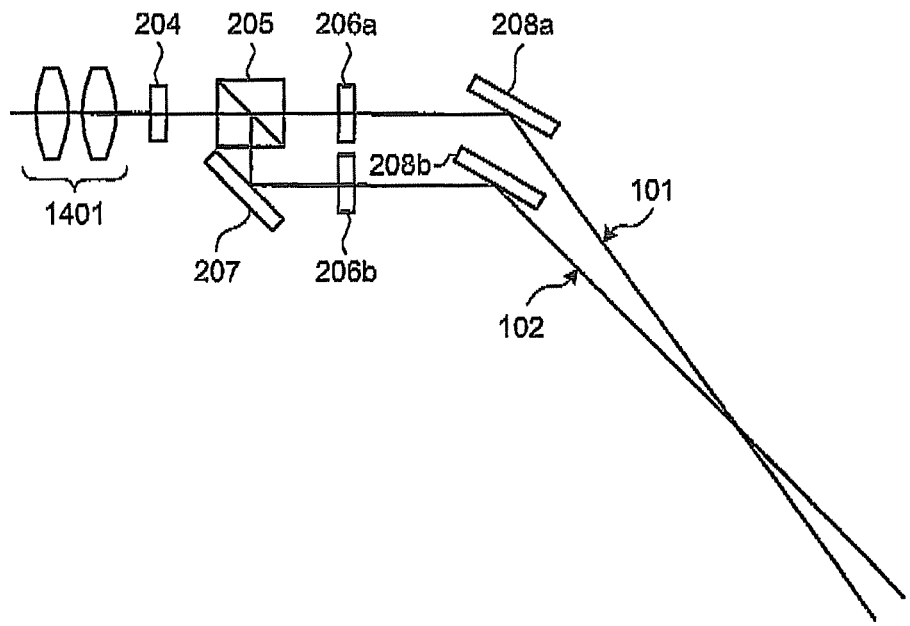
FIG. 17 is a schematic diagram of an optical structure from splitting of a reference beam to entering thereof into a holographic-memory recording medium according to a ninth modification of the present invention.

In the first embodiment, the polarization beam splitter 203 splits the reference beam into the reference beam 101 and the reference beam 102 with required beam diameter. However, if it does not split the reference beam with the beam diameter, the optical system is structured like a ninth modification according to the present invention as follows. Specifically, as shown in FIG. 17, by arranging a relay lens 1401 between the polarization beam splitter 203 and the half-wave plate 204, the beam diameter of a reference beam emitted from the polarization beam splitter 203 is simply controlled.

Figure 18:
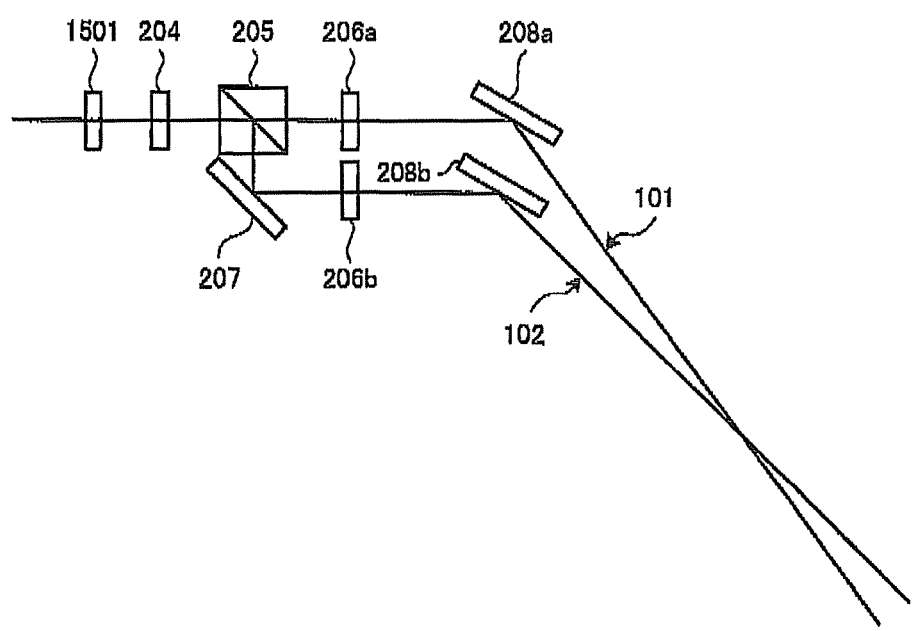
FIG. 18 is a schematic diagram of an optical structure from splitting of a reference beam to entering thereof into a holographic-memory recording medium according to a tenth modification of the present invention.

As shown in FIG. 18, in a tenth modification according to the present invention, to control the beam diameter of a reference beam emitted from the polarization beam splitter 203, an aperture diaphragm 1501 may be provided instead of the relay lens 1401.

The embodiments and the modifications show the examples in which the optical information recording/reproducing apparatus and method according to the present invention are applied to the holographic-memory recording/reproducing apparatus that records and reproduces information in and from the holographic-memory recording medium 201. However, the present invention is also applicable to a holographic-memory recording device that records information in the holographic-memory recording medium 201 and to a holographic-memory reproducing device that reproduces information from the holographic-memory recording medium 201.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical information recording/reproducing apparatus comprising:
   a spatial light modulator that converts an irradiation beam emitted from a light source to a single information beam that carries information;
   an optical system that causes the single information beam to be collected on an optical-information recording medium including an information recording layer capable of recording the information as hologram by using interference fringes produced due to interference between the single information beam and a plurality of reference beams, and causes each of the reference beams to be irradiated to the optical-information recording medium from mutually different directions so as to intersect with the single information beam in the information recording layer at data recording;
   a drive unit that drives either one of the optical-information recording medium and the optical system; and
   a controller that control to cause the light source to emit the irradiation beam and performs angular multiplexing recording of the information in the information recording layer while controlling to drive either one of the optical-information recording medium and the optical system,
   wherein
   the optical system further includes a splitter that splits a single irradiation beam into a plurality of reference beams,
   the splitter splits the single irradiation beam into a first reference beam and a second reference beam, and
   optical components of the optical system are arranged so as to satisfy a following expression:

$\sin^{-1}|\sin \zeta_{si}| < |\zeta_{ri}| < 60$ (degrees) (I=1 or 2)

wherein $\zeta_{r1}$ is an elevation angle of the first reference beam, $\zeta_{s1}$ is a maximum elevation angle of the single information beam on the same side as the elevation angle $\zeta_{r1}$ of the first reference beam, $\zeta_{r2}$ is an elevation angle of the second reference beam, and $\zeta_{s2}$ is a maximum elevation angle of the single information beam on the same side as the elevation angle $\zeta_{r2}$ of the second reference beam, as viewed from the incident plane of an optical axis of the single information beam in the information recording layer.

2. An optical information recording/reproducing method comprising:

converting an irradiation beam emitted from a light source to a single information beam that carries information;

causing, by an optical system, the single information beam to be collected on an optical-information recording medium including an information recording layer capable of recording the information as hologram by using interference fringes produced due to interference between the single information beam and a plurality of reference beams, and causing each of the reference beams to be irradiated to the optical-information recording medium from mutually different directions so as to intersect with the single information beam in the information recording layer at data recording;

controlling to cause the light source to emit the irradiation beam and performs angular multiplexing recording of the information in the information recording layer while controlling to drive either one of the optical-information recording medium and the optical system by a drive unit; and switching between irradiations of the reference beams to the optical-information recording medium at data recording, wherein the optical system further includes a splitter that splits a single irradiation beam into a plurality of reference beams, the splitter splits the single irradiation beam into a first reference beam and a second reference beam, and optical components of the optical system are arranged so as to satisfy a following expression:

$$\sin^{-1}|\sin \zeta_{si}| < |\zeta_{ri}| < 60 \text{ (degrees) } (I=1 \text{ or } 2)$$

wherein $\zeta_{r1}$ is an elevation angle of the first reference beam, $\zeta_{s1}$ is a maximum elevation angle of the single information beam on the same side as the elevation angle $\zeta_{r1}$ of the first reference beam, $\zeta_{r2}$ is an elevation angle of the second reference beam, and $\zeta_{s2}$ is a maximum elevation angle of the single information beam on the same side as the elevation angle $\zeta_{r2}$ of the second reference beam, as viewed from the incident plane of an optical axis of the single information beam in the information recording layer.

\* \* \* \* \*